US008508472B1

(12) United States Patent  
Wieder

(10) Patent No.: US 8,508,472 B1
(45) Date of Patent: *Aug. 13, 2013

(54) WEARABLE REMOTE CONTROL WITH A SINGLE CONTROL BUTTON

(76) Inventor: James W. Wieder, Ellicott City, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/342,131

(22) Filed: Jan. 2, 2012

Related U.S. Application Data

(63) Continuation-in-part of application No. 11/563,785, filed on Nov. 28, 2006, now Pat. No. 8,089,455.

(51) Int. Cl.
*G09G 5/00* (2006.01)

(52) U.S. Cl.
USPC ........................... 345/156; 345/165; 345/166

(58) Field of Classification Search
USPC .................................................. 345/156–181
See application file for complete search history.

(56) References Cited

U.S. PATENT DOCUMENTS

| 3,541,541 | A | 11/1970 | Engelbart et al. |
|---|---|---|---|
| 4,787,051 | A | 11/1988 | Olson |
| 4,839,838 | A | 6/1989 | LaBiche et al. |
| 4,862,152 | A | 8/1989 | Milner |
| 5,138,154 | A | 8/1992 | Hotelling |
| 5,181,181 | A | 1/1993 | Glynn |
| 5,359,348 | A | 10/1994 | Pilcher et al. |
| 5,440,326 | A | 8/1995 | Quinn |
| 5,545,857 | A | 8/1996 | Lee et al. |
| 5,703,623 | A | 12/1997 | Hall et al. |
| 5,825,350 | A | 10/1998 | Case, Jr. et al. |
| 5,835,156 | A | 11/1998 | Blonstein et al. |
| 5,867,146 | A * | 2/1999 | Kim et al. ............ 345/158 |
| 5,898,421 | A | 4/1999 | Quinn |
| 6,016,144 | A | 1/2000 | Blonstein et al. |
| 6,501,515 | B1 | 12/2002 | Iwamura |
| 6,552,714 | B1 * | 4/2003 | Vust ....................... 345/157 |
| 6,747,632 | B2 | 6/2004 | Howard |
| 6,753,849 | B1 | 6/2004 | Curran et al. |
| 6,803,907 | B2 * | 10/2004 | Chen ....................... 345/182 |
| 6,870,526 | B2 | 3/2005 | Zngf et al. |

(Continued)

OTHER PUBLICATIONS

Airmouse Initiative (Cornell Univ); web: http://courses.cit.cornell.edu/ee476/FinalProjects/s2005/ajs94_jst36/index.html.

(Continued)

*Primary Examiner* — Duc Dinh
(74) *Attorney, Agent, or Firm* — James W. Wieder

(57) ABSTRACT

An apparatus and method for the remote control and/or interaction-with electronic-devices such as computers; home-entertainment-systems; media-centers; televisions; DVD-players; VCR-players; music systems; appliances; security systems; toys/games; and/or displays. A user may orient a pointer (e.g., laser pointer) to place a pointer-spot on/near object(s) on an active-display(s); and/or a fixed-display(s); and/or on real-world object(s) within a display region or pointer-spot detection-region. Detectors, imager(s) and/or camera(s) may be connected/attached to the display region and/or a structure that is connected/attached to display region. When the user initiates a "select", the detectors/cameras may detect the location of the pointer-spot within the display region. Corresponding to the user's selection(s); control action(s) may be performed on the device(s) being controlled/interacted-with and additional selection-menus may be optionally presented on an active-display.

22 Claims, 26 Drawing Sheets

(56) References Cited

U.S. PATENT DOCUMENTS

| | | | |
|---|---|---|---|
| 6,967,695 B2 * | 11/2005 | Hoshino et al. | 348/734 |
| 7,102,616 B1 | 9/2006 | Sleator | |
| 7,123,180 B1 | 10/2006 | Daniell et al. | |
| 7,158,118 B2 | 1/2007 | Liberty | |
| 7,236,156 B2 | 6/2007 | Liberty et al. | |
| 7,239,301 B2 | 7/2007 | Liberty et al. | |
| 7,260,789 B2 | 8/2007 | Hunleth et al. | |
| 7,262,760 B2 | 8/2007 | Liberty | |
| 7,443,381 B2 | 10/2008 | Mo | |
| 2004/0268393 A1 | 12/2004 | Hunleth et al. | |
| 2005/0219213 A1 | 10/2005 | Cho et al. | |
| 2006/0250353 A1 | 11/2006 | Yasutake | |
| 2006/0290684 A1 * | 12/2006 | Giraldo et al. | 345/175 |
| 2007/0139370 A1 | 6/2007 | Lu et al. | |
| 2007/0176896 A1 | 8/2007 | Gritton et al. | |
| 2011/0007035 A1 * | 1/2011 | Shai | 345/179 |

OTHER PUBLICATIONS

Minority Report Mouse (Accelerometer Based Mouse) Cornell Univ; web: http://courses.cit.cornell.edu/ee476/FinalProjects/s2005/mouse%20webpage%20KM249_AK288/index.htm.

Logitech MX Air Mouse; web: http://www.logitech.com/en-us/mice-pointers/mice/devices/3443.

Hillcrest Labs Freespace Motion Technology; web: http://hillcrestlabs.com/products/freespace-enabled-products.php.

Movea Enhances Gyrations UltraSense Air Mouse; web: http://www.gyration.com/index.php/us/news/press-releases/movea-enhances-gyrations-technology.html.

Gyrations M2000 Travel Air-Mouse; web: http://news.softpedia.com/news/Gyration-039-s-M2000-Travel-Air-Mouse-Works-Like-the-Wiimote-But-Mouse-ier-66987.shtml.

AirMouse—The Mouse that fits you like a glove; web: http://www.gizmag.com/airmouse-wearable-mouse/13993/.

* cited by examiner

Prior Art Fig. 0a
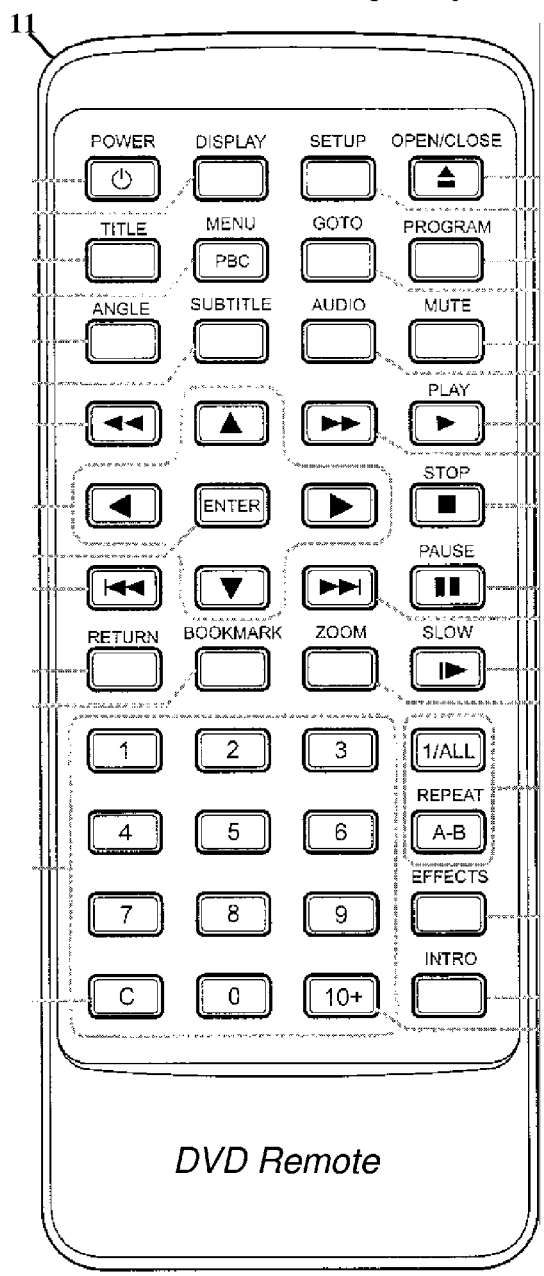
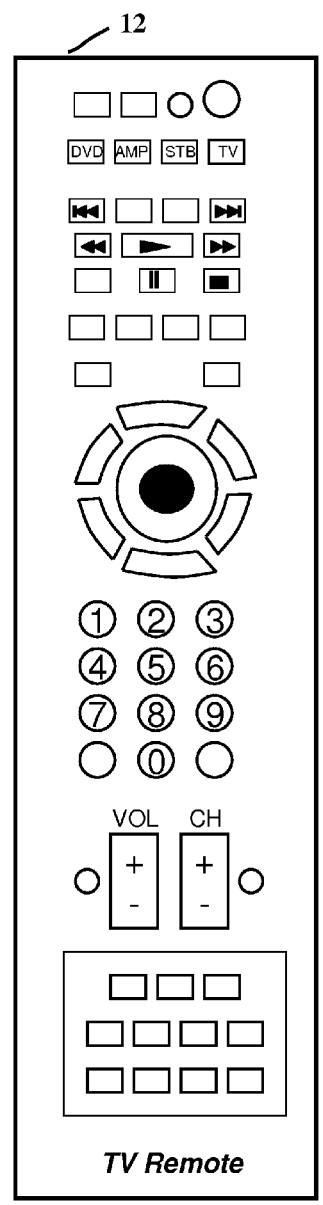

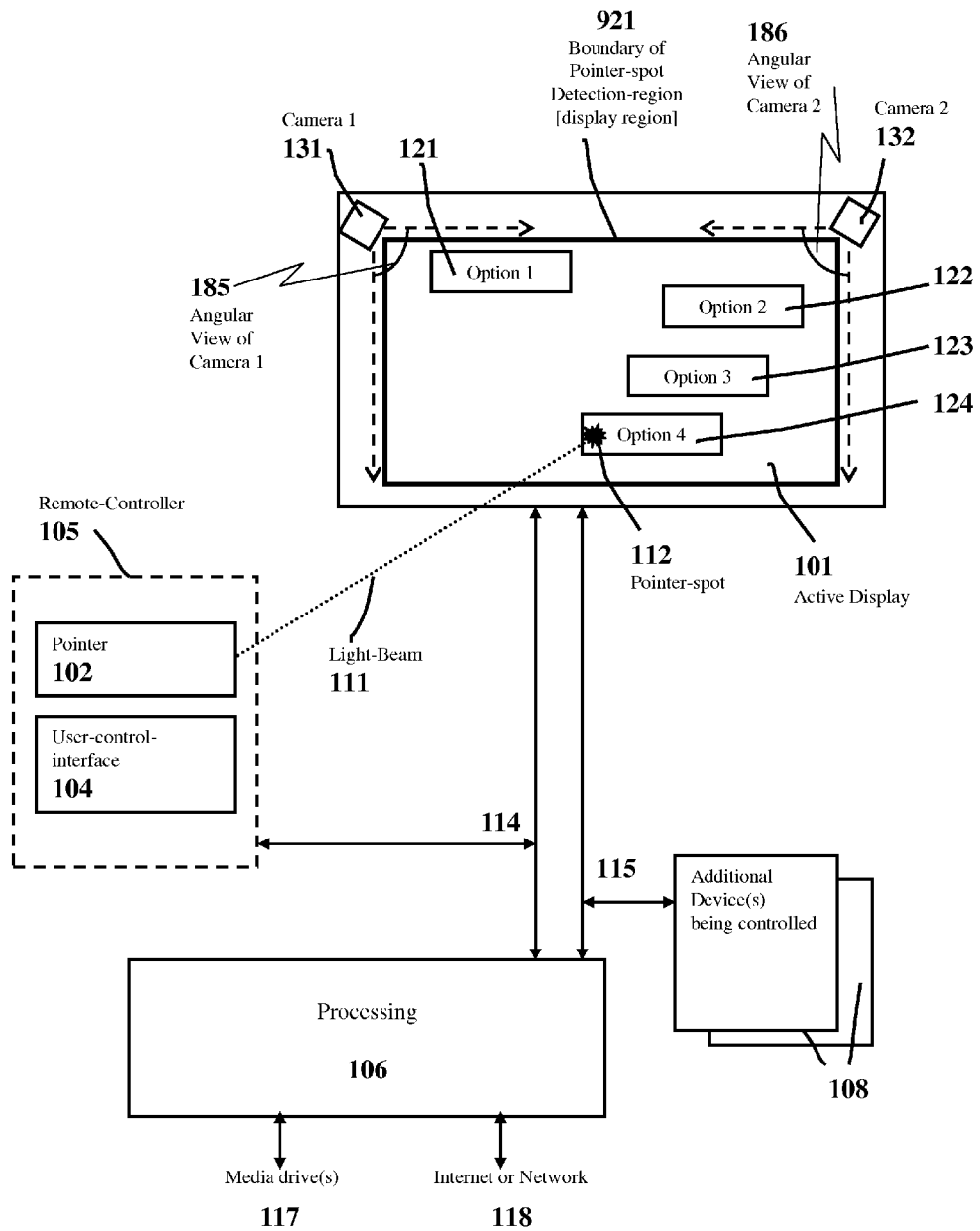

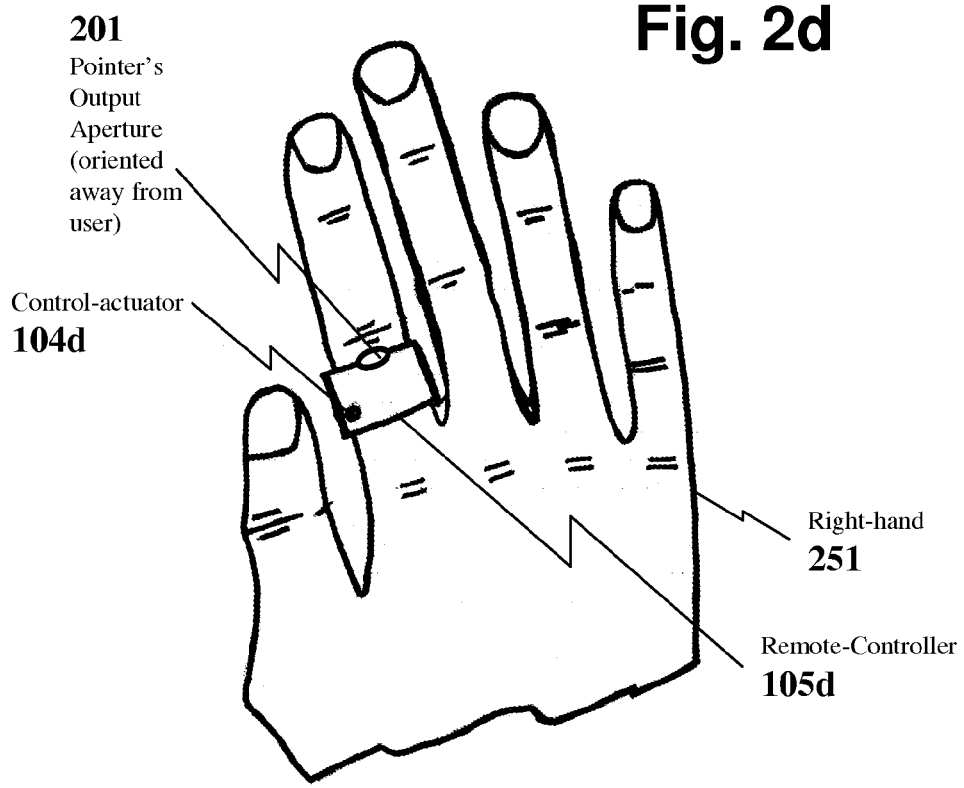
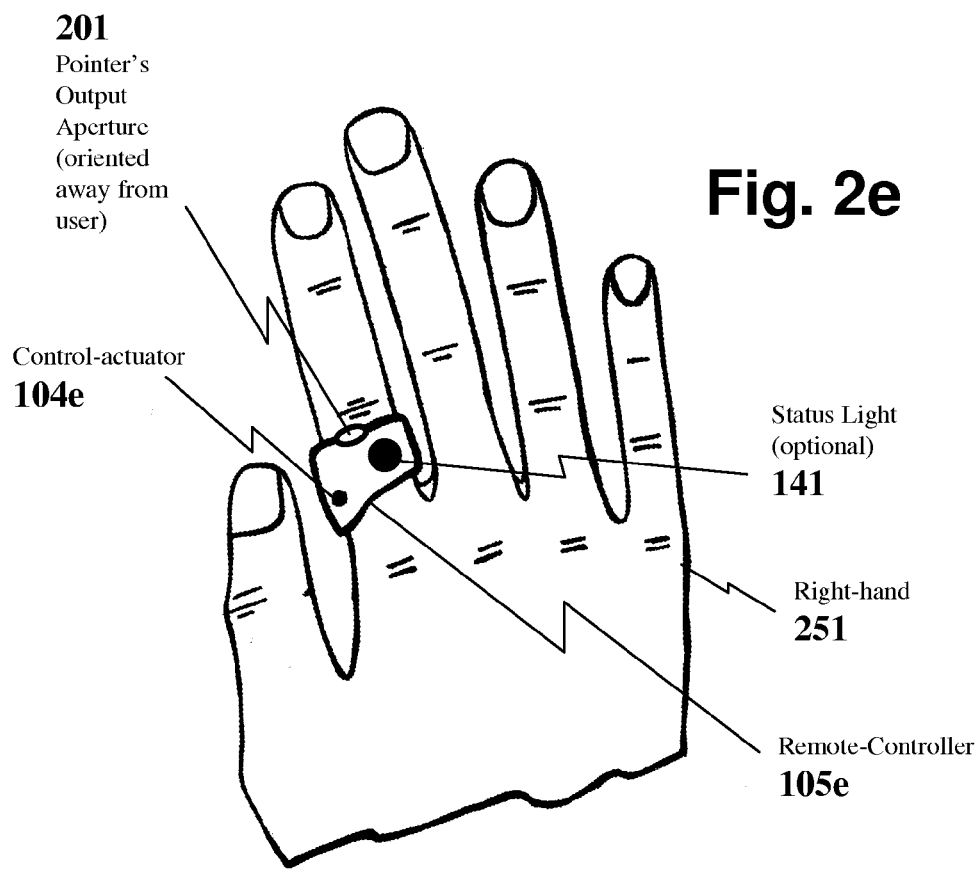

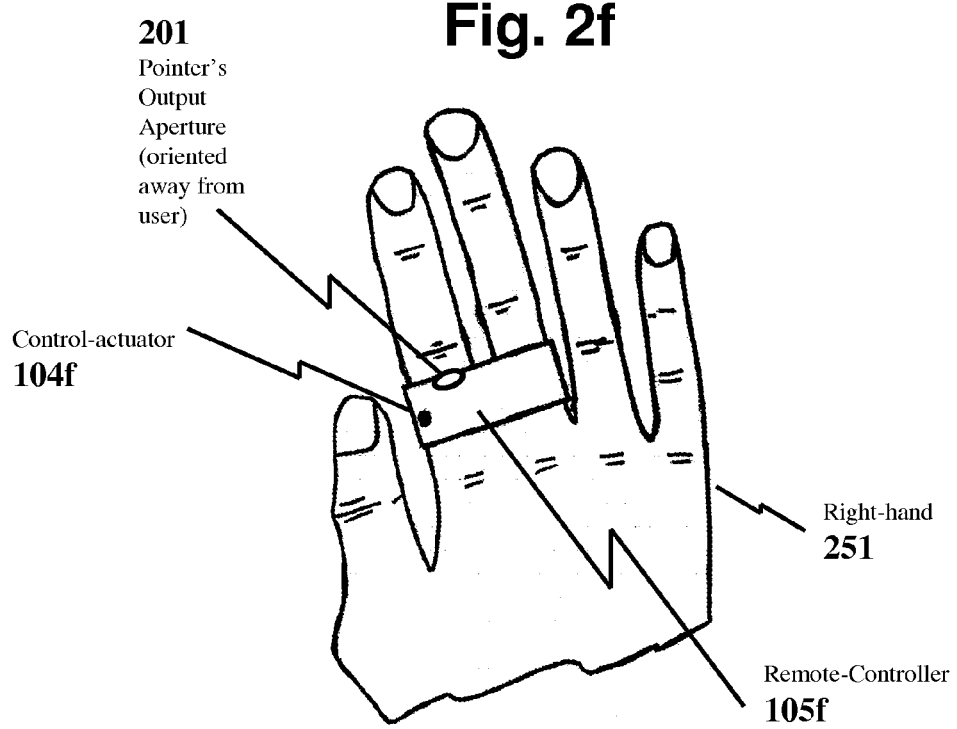
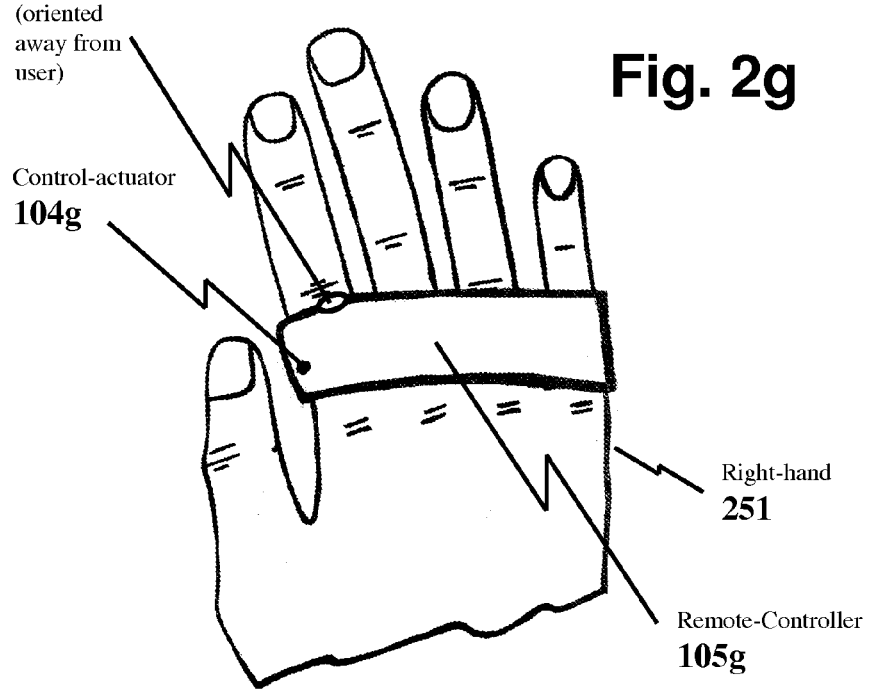

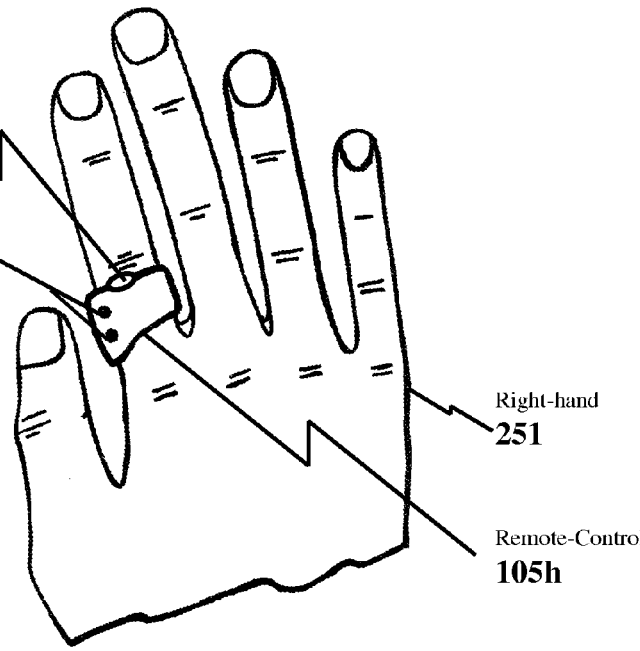
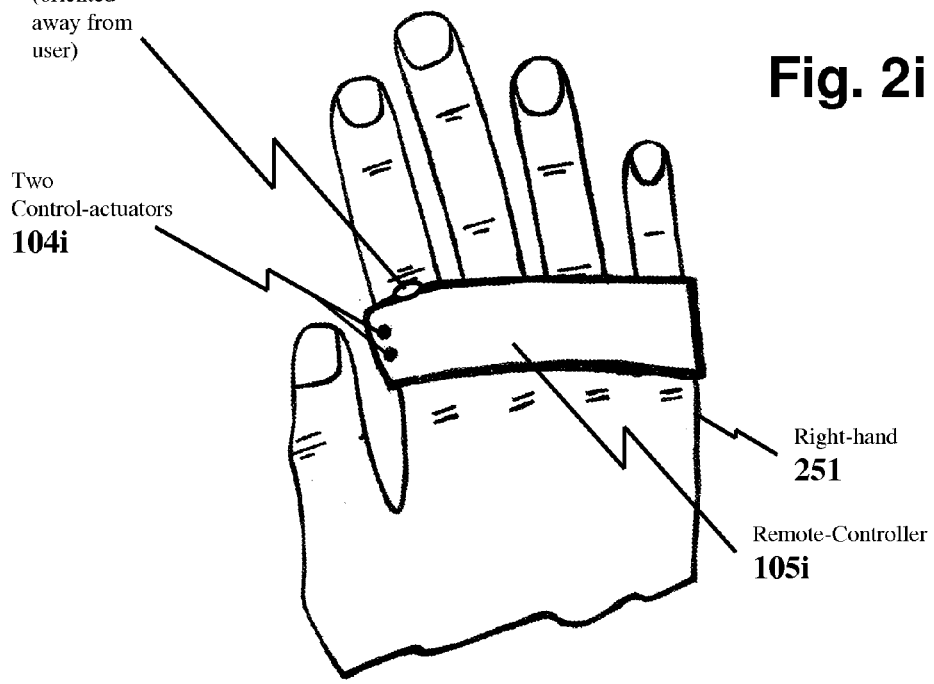

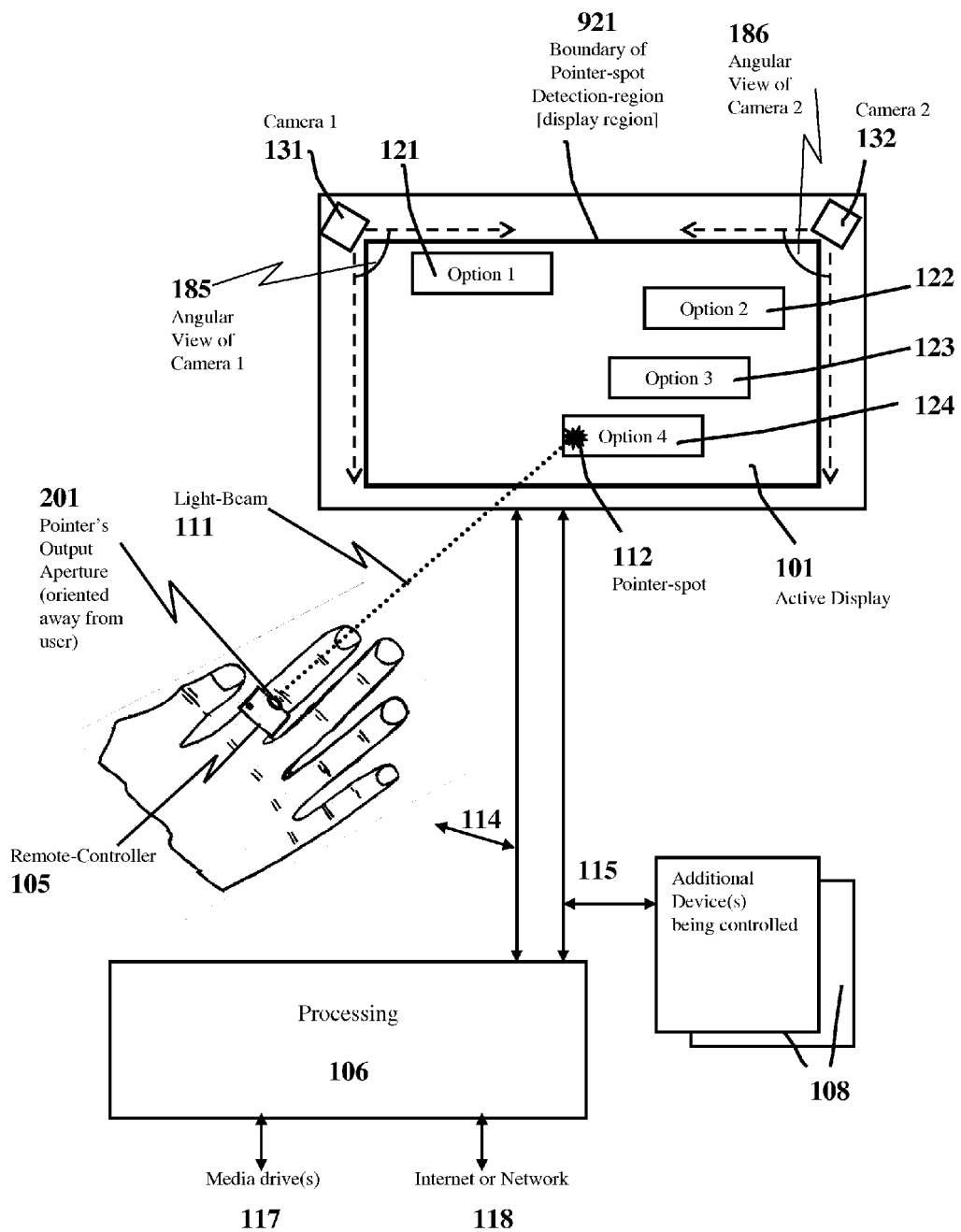

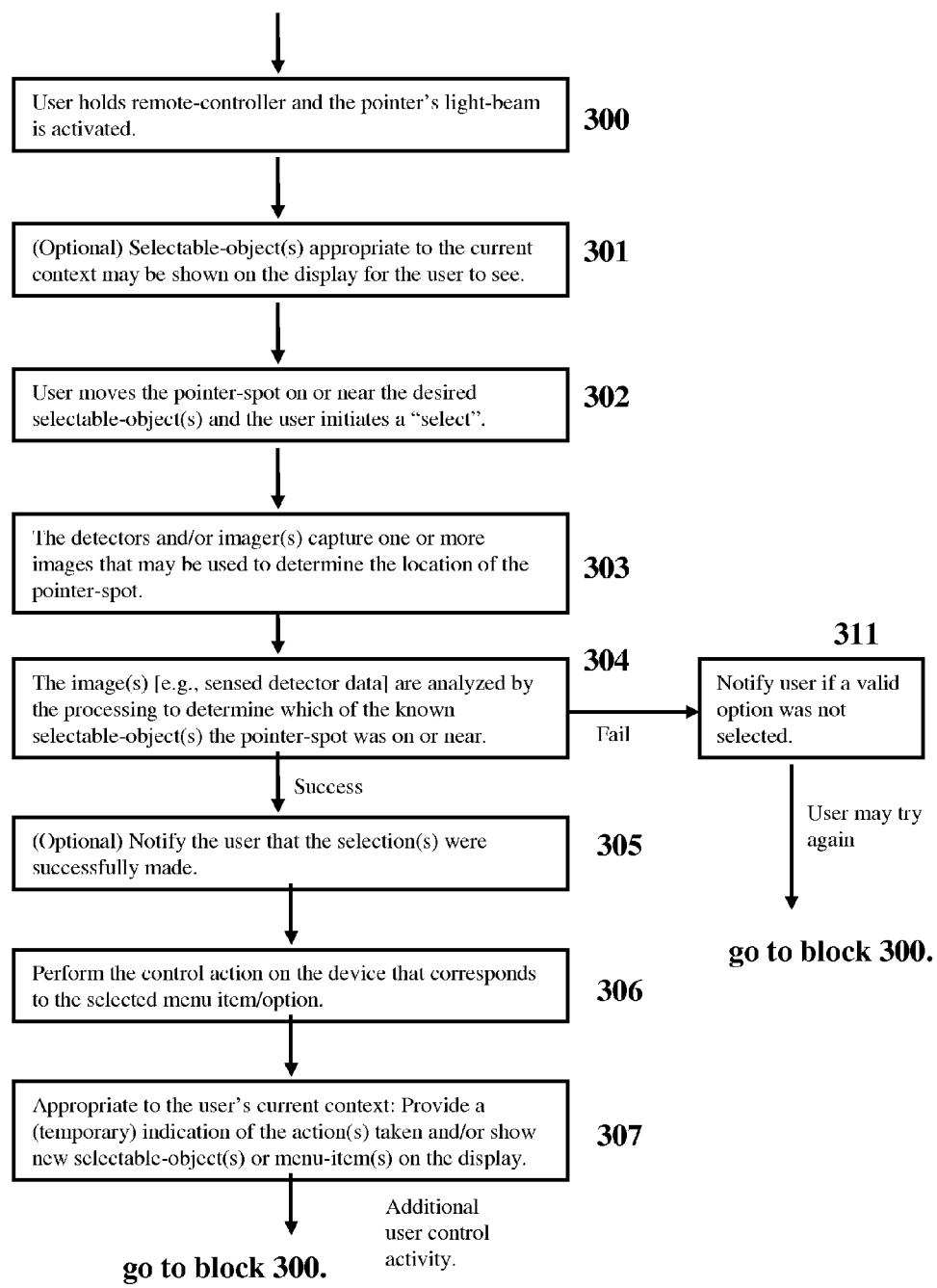

Fig. 7a

| Image ID | Selectable-object ID. | Control-action to take. | New image to display or modification of prior image. |
|---|---|---|---|
| Control-menu 5 | Volume-up | Increase volume by 1 increment. | Control-menu 5. |
| Control-menu 5 | Select Video Source. | none | Control menu 6 (select video source menu). |
| Control-menu 5 | Exit. (Remove menus) | none | Remove control-menu. Display video program. |

Fig. 7b

| Image ID | Location in Display-Region | Selectable-object ID. |
|---|---|---|
| Control-menu 5 | Rectangle:<br>x1:y1 to x2:y1<br>x1:y2 to x2:y2 | Volume-up |
| Control menu 5 | Rectangle:<br>x3:y3 to x4:y3<br>x3:y4 to x4:y4 | Select Video Source |
| Control-menu 5 | Rectangle:<br>x5:y5 to x6:y5<br>x5:y6 to x6:y6 | Exit (Remove menus) |

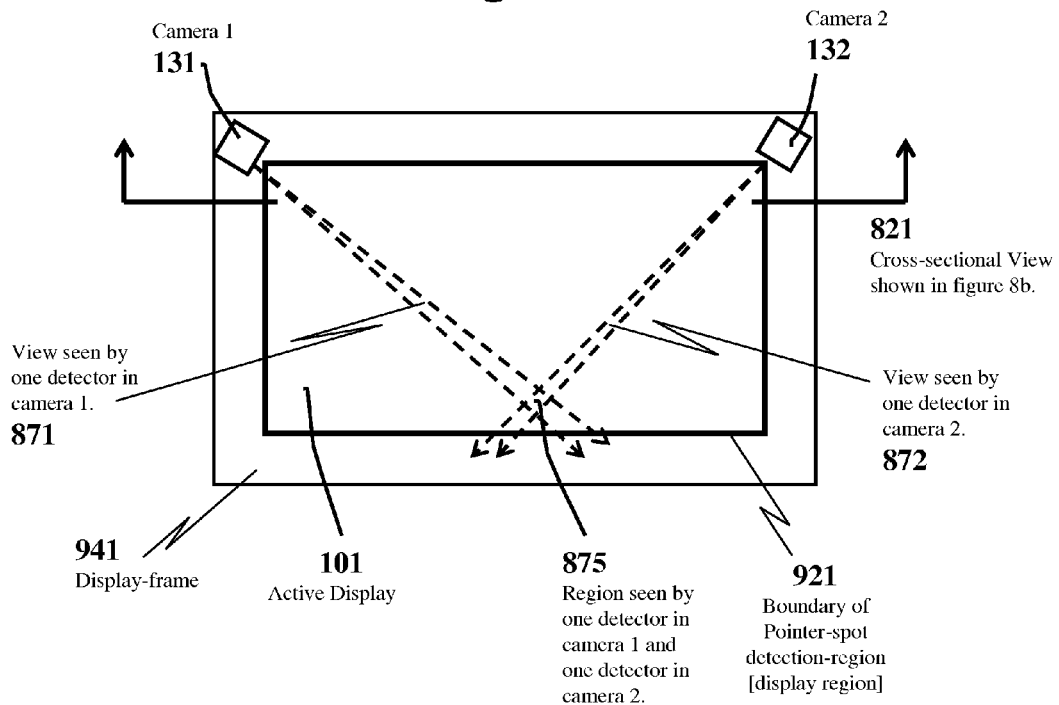
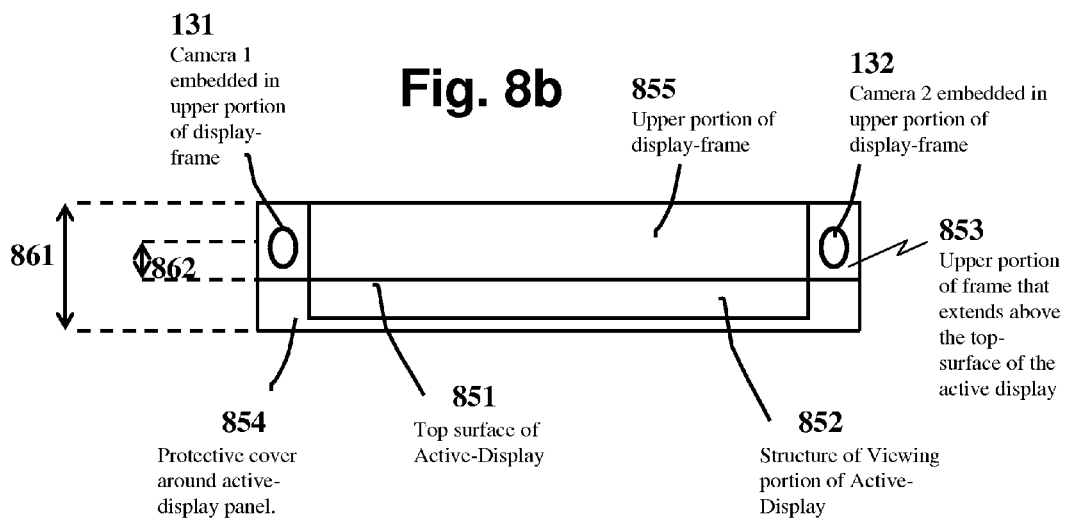

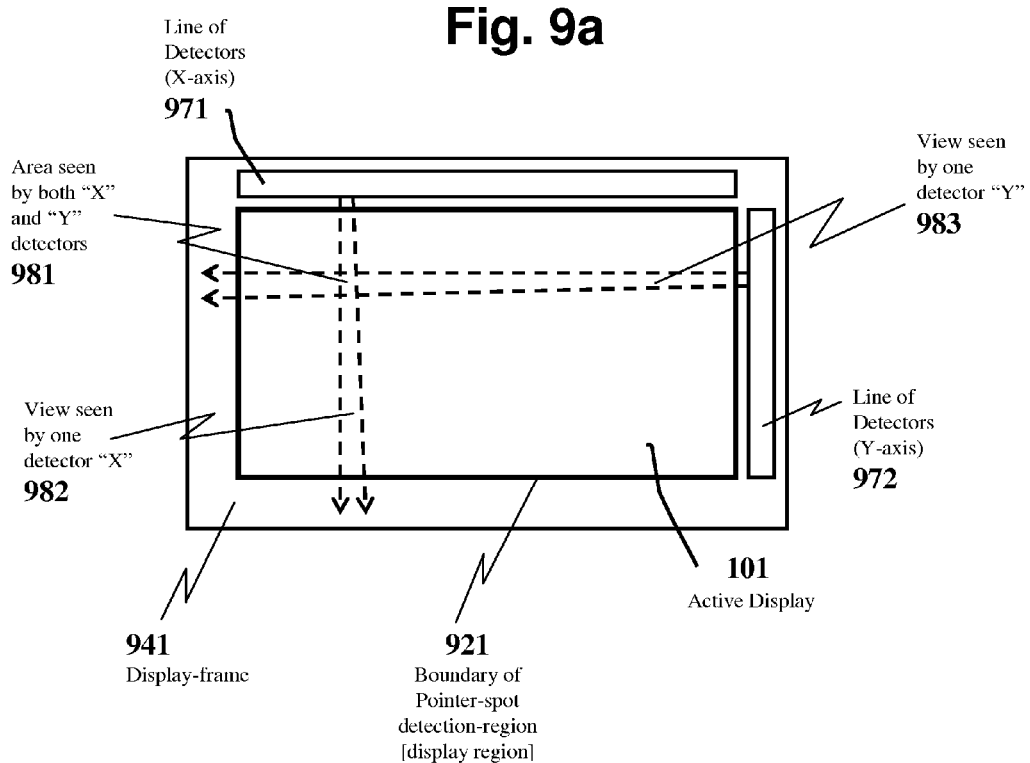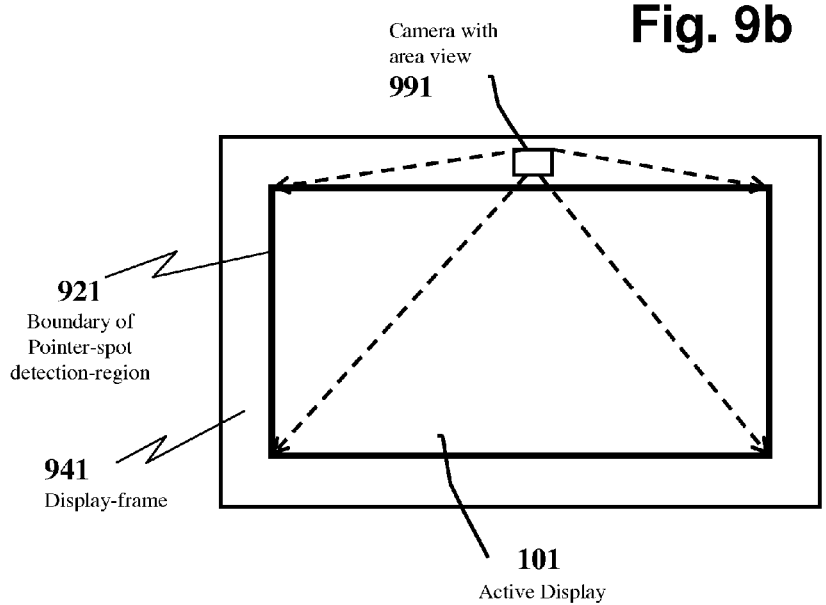

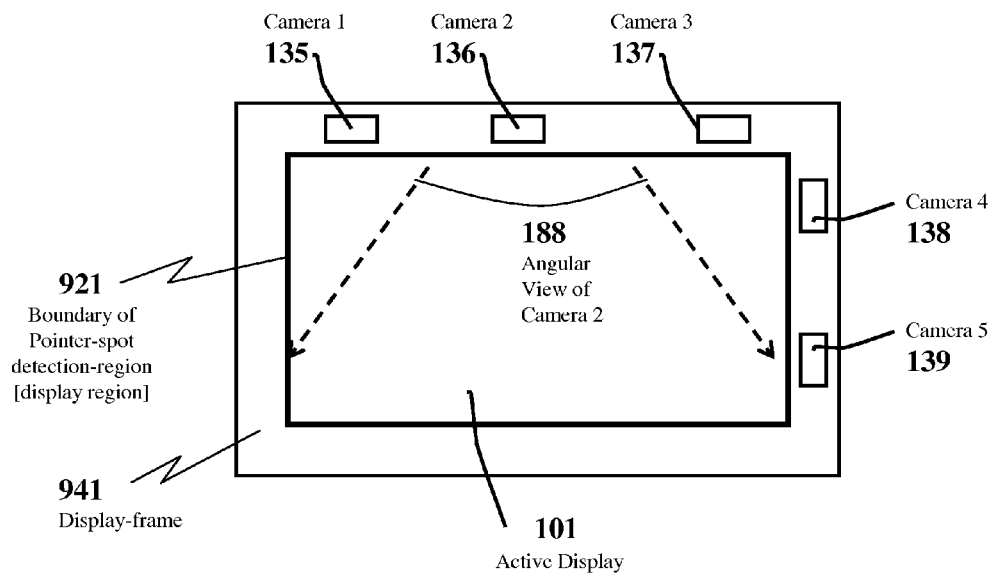
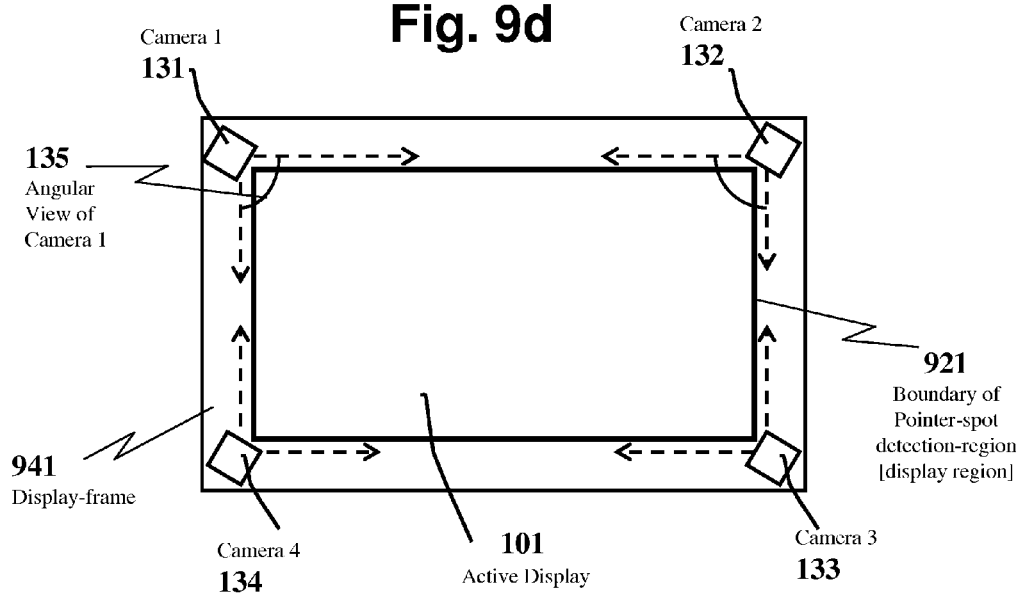

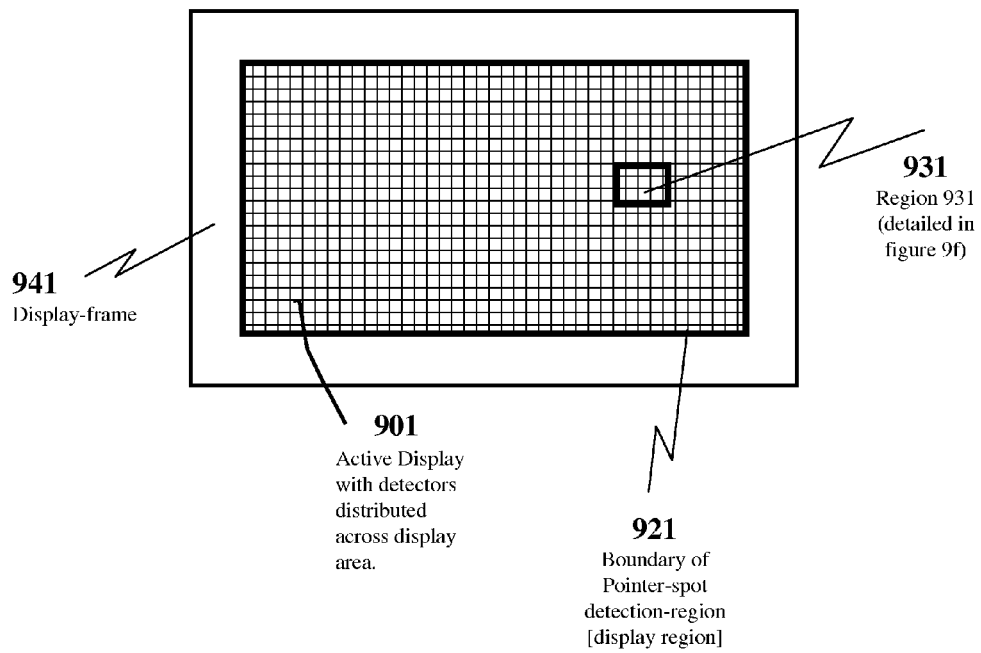
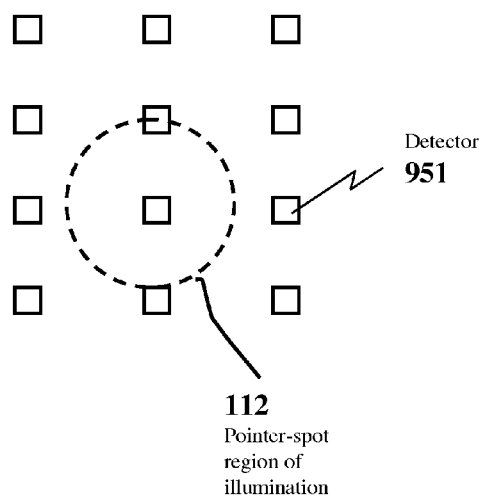

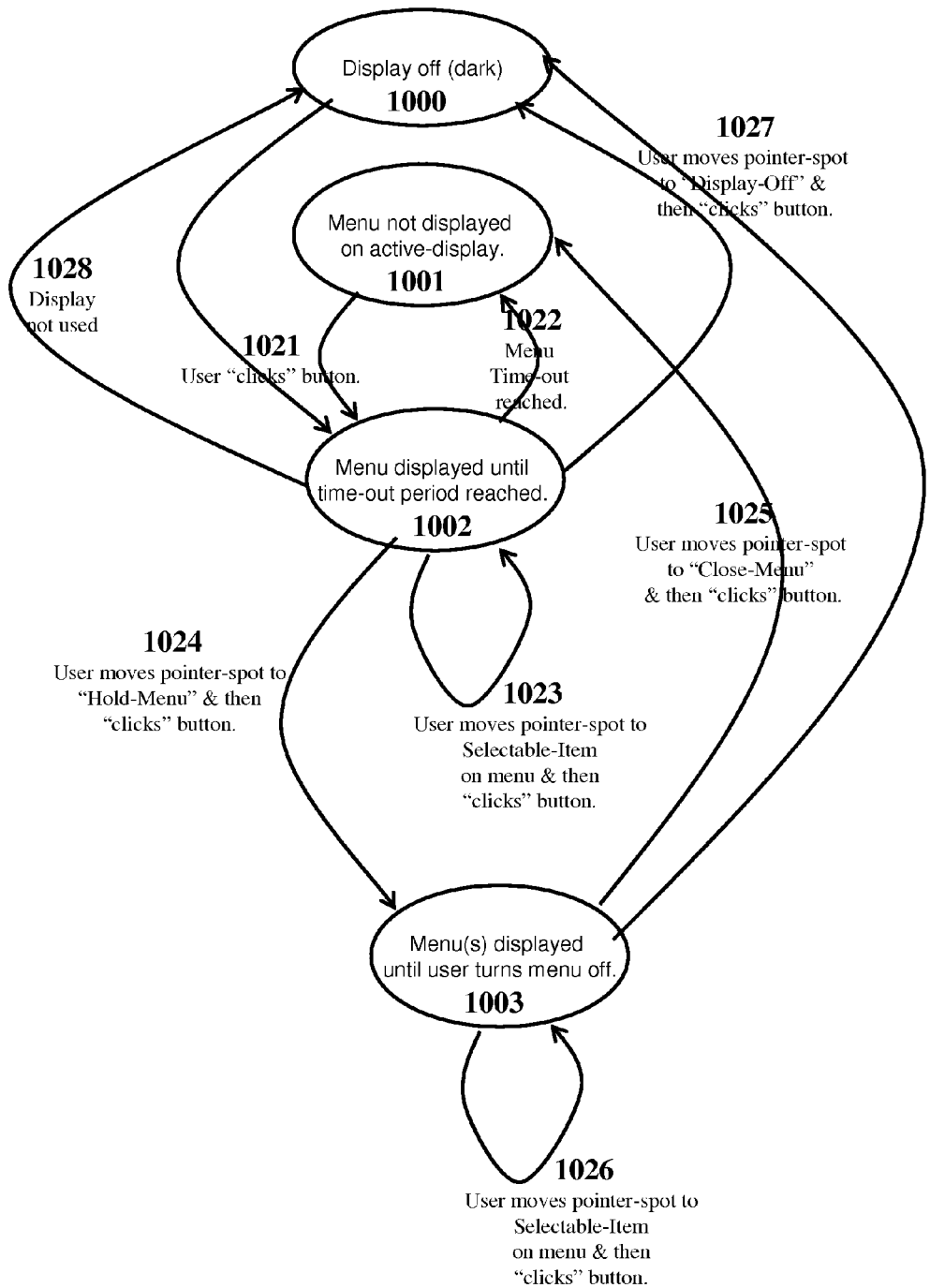

WEARABLE REMOTE CONTROL WITH A SINGLE CONTROL BUTTON

CROSS REFERENCE TO RELATED APPLICATIONS

This application is a continuation-in-part of U.S. application Ser. No. 11/563,785, filed on Nov. 28, 2006, originally entitled "Remote Control and Interaction using Pointer(s) and Display Detectors". This earlier application in its entirety is incorporated by reference into this specification.

BACKGROUND OF INVENTION

1. Field of the Invention

This invention relates to the remote control-of and/or interaction-with electronic-devices such as computers; home-entertainment-systems; media-centers; televisions; DVD-players; VCR-players; music systems; displays; appliances; security systems; games/toys; or any other type of device that user(s) may control or interact with.

2. Description of Related Art

Current remote controls are complex to use because of the large number of control-buttons they have. Two examples of prior art remote controllers are shown in FIG. 0a. Some remotes have over 50 physical buttons. In addition, some remotes utilize multi-button functional combinations which further increase the user complexity. Many users do not know what all the buttons do or how to use them. At any given time, only a portion of the buttons may be functional; but the presence of these non-functional buttons makes it more difficult for the user to find the button for the desired function.

The large quantity of buttons leads to small size buttons that are tightly packed (e.g., large fingers) and small size labels (e.g., farsighted) that present additional difficulties for certain users. The small size buttons often result in text-abbreviations or small-icons that the user has difficulty seeing and/or deciphering their intended function. In addition, the user may be using the remote-control in a darkened room, where limited ambient light may make it difficult to find the desired buttons.

In addition, in many applications, the user is required to continually switch between nearsighted tasks (of looking at the control buttons) and farsighted tasks (of looking up at a display) which may present range of focus/correction problems for certain users.

In addition, if the user presses the wrong button, the remote-control may enter a mode that the user doesn't know how to get out of or to accidentally make changes to the set-up configuration that the user may not know how to undo or must expend great effort to determine how to undo.

In addition, the user must use specific navigation buttons such as up; down; right; and/or left to move the selection-point on the screen. The user often needs to press the navigation buttons multiple times and in a particular order to arrive at the desired selection point. In addition, the user may need to alternately look up to the screen and back-down to the navigation and/or other control buttons multiple times; to check that the navigation movements or control actions are happening as expected and the intended action is occurring.

Some prior art has used an illumination-pointer (e.g., laser-pointer). For example, a camera may be mounted separately and remotely from the display, in-order to "see" the pointer's spot. A major disadvantage of a separately mounted camera is that the difficulty in setting-up, adjusting, aligning and calibrating the camera to be able to see and recognize a specific region. The need to set-up a separate camera increases the user complexity and increases the time and effort required before the user can begin using their purchase(s).

In addition, if the camera's view is incorrectly set-up or is later disturbed, the camera may not be able to "see" the region of interest with sufficient accuracy.

In addition, there are many situations where the desired location(s) for a remotely located camera are undesirable from the user's perspective due to aesthetic or other competing uses for that location (e.g., in a home family-room or living-room).

In addition, in some configurations and applications, other users or everyday objects may temporarily or suddenly block the remotely located camera's view. For example, a user may stand or place a real-world object (e.g., a chair) between the remotely located camera and the display. When this happens, the system will suddenly stop working and the user may not realize why and become frustrated. The user may blame the system for being unreliable and wish to return their unit.

In addition, if the user wants to move the display to a new location or to different viewing angle, the remote camera must also be moved and then the set-up process repeated again. This significantly increases the user complexity and prevents the user from quickly moving their display to other locations (e.g., another room) or to other viewing angles (e.g., turning or tilting the display to prevent glare or so others users can also see the display).

In addition, those skilled in the art will realize that there are many other disadvantages of using a separately positioned camera to view the pointer's spot on a display.

What is desired is a simpler way of remotely controlling and/or interacting-with electronic-devices.

SUMMARY OF INVENTION

Detectors and/or camera(s) may be attached and/or embedded into a display or display structure so that a pointer-spot (e.g., laser-pointer) may be detected when it is at any location within a defined detection-region. The detection-region may include active-display(s) and/or fixed-display(s) and/or real-world objects that the user may select or interact-with.

A user may orient a pointer to place the pointer-spot on/near selectable-object(s) present on an active-display or a fixed-display or a real-world object, that are within the detection-region 921. When the user initiates a "select", the detectors and/or imager(s) [e.g., cameras] may sense the location of the pointer-spot within the detection-region 921 [e.g., display region]. The captured-image(s) [e.g., the detector responses] may be analyzed to determine the pointer-spot location(s) and to determine which object(s) the user selected [e.g., the object(s) the user was pointing at]. The desired-action(s) that correspond to the user's selection(s) may be performed on the device(s) being controlled and/or other actions taken that correspond with the user's intention.

The detectors and imager(s) may be aligned and calibrated with the display region 921 so the location of the pointer-spot within the display region may be determined. In one embodiment of the invention, one or more cameras may be mounted-to and/or integrated-with the display region or a structure that attaches to the display region. In another alternative embodiment, the detectors are distributed across the active-display(s) and/or fixed-displays and/or real-world-objects in the display region.

The invention may be used as a remote-control for one or more electronic-devices (e.g., televisions; DVD-players; music-systems; appliances). The invention may also be used as a computer-mouse or pointing-device, in-order to interact with objects on an active-display (such as a computer).

In some embodiments, a dedicated control-display may be used. In other embodiments, the control-display may be shared with other user-device functions (e.g., a television-display may be temporarily used as a control-display) and/or use only a portion of the active-display 101.

A single control-display may be used to control and/or interact-with a plurality of electronic-devices. Alternatively, a plurality of control-displays may be located in multiple locations [e.g., around a home or business] where each control-display may be used to control all or any subset of the devices. The invention may also be used to control devices remotely across the Internet or other Wide-Area-Network (e.g., home devices may also be controlled from work or other locations).

A plurality of user-devices that are to be controlled, may be added/removed by automatically detecting their attachment/removal on a network or communication-backbone via plug-and-play and/or standard device-discovery techniques.

In an alternative embodiment, the detectors and/or imager(s) may be mounted [and calibrated] onto a frame-assembly. The frame-assembly may then be attached to active and/or fixed display(s); either during the manufacturing process or at a later time [e.g., retro-fitted to an existing display in a user's home].

Some objectives and advantages of the invention [depending on the embodiment] may include one or more of the following:
- Intuitively simple for a user to use.
- Eliminate the need for navigation buttons such as up; down; left; right.
- Reduce or eliminate the need for the user to look-down at the controller to find the correct button to push and then back up to the display to see if it happened.
- Reduce the number of controls/buttons the user must deal with. In some embodiments, only one control and/or button is needed.
- Simplify user choices/selections to only those that are valid possibilities in the current context.
- Work with any type of active-display and/or fixed-display and/or everyday real-world-object.
- Reduce the amount of user set-up and configuration.

Some additional objectives and features of the invention [depending on the embodiment] include:
- A single remote-controller may be used to control multiple devices.
- Automatically adapt as devices are added/removed from a user's system.
- May be implemented as a "universal" remote-controller.
- In one option, may be implemented to be backwardly compatible with older electronic-devices that are controllable via infrared control-codes.

BRIEF DESCRIPTION OF DRAWINGS

The invention will be better understood by reference to the detail description taken in conjunction with the accompanying drawings.

FIG. 0a shows examples of prior art remote-controllers.

FIG. 1 illustrates an overview of the remote-control functionality for one embodiment.

FIG. 2d illustrates an embodiment of a wearable remote-controller that may be worn on a user's index finger.

FIG. 2e illustrates another embodiment of a wearable remote-controller that may be worn on a user's index finger.

FIG. 2f illustrates an embodiment of a wearable remote-controller that may be worn on two fingers.

FIG. 2g illustrates an embodiment of a wearable remote-controller that may be worn on a user's hand.

FIG. 2h illustrates an embodiment of a wearable remote-controller with 2 control-actuators that may be worn on a user's index finger.

FIG. 2i illustrates an embodiment of a wearable remote-controller with 2 control-actuators that may be worn on a user's hand.

FIG. 2j illustrates a wearable remote-controller being used to position the pointer-spot on a selectable-object.

FIG. 3 shows the functional steps for one embodiment of using a pointer-spot to control an electronic-device.

FIG. 7a shows a simplified example of a table that may be used to pre-define what actions are to be taken, when selectable-objects are selected in each display-image or display-region.

FIG. 7b shows a simplified table that may be used to define the location of each selectable-object in a display-region or control-menu.

FIG. 8a shows a region 875 of the active-display where the reflected pointer-spot is simultaneously visible to one specific detector in camera 131 and one specific detector in camera 132.

FIG. 8b shows a cross-sectional view 821 (see FIG. 8a) of the display-frame and the active-display surface showing an example where the cameras are located above the active display surface [e.g., display region].

FIG. 9a shows an example utilizing a line of detectors, along the X and Y axis, that are attached to an active-display or display-frame or display region.

FIG. 9b shows an example utilizing a single area-view camera that is attached to an active-display or display-frame or display region.

FIG. 9c shows an example utilizing multiple cameras positioned along both the X and Y axis of the active-display or display-frame or display region.

FIG. 9d shows an example utilizing cameras attached near the four corners of the active-display or display-frame or display region.

FIG. 9e shows an example of distributing detectors [that are capable of detecting the pointer-spot] across the area of an active-display.

FIG. 9f is a detailed view of region 931 illustrating a distribution of detectors across the display area and the relative detector and pointer-spot sizes.

FIG. 18 illustrates one embodiment of a state control diagram for control of an active-display and selection of selectable-objects from display-menus.

DETAIL DESCRIPTION

Figure 2A:
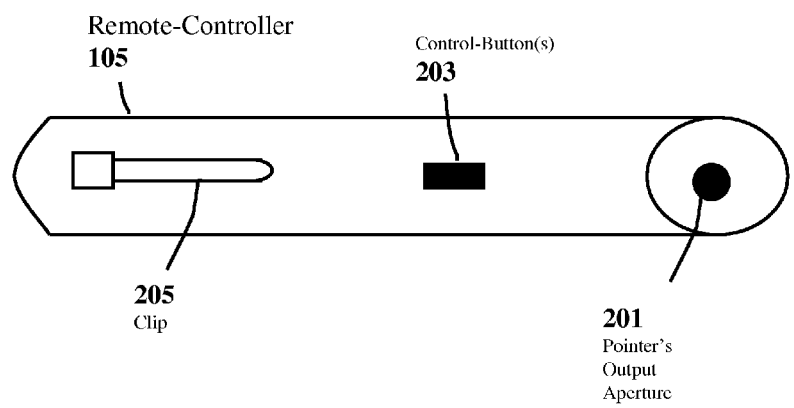
FIG. 2a illustrates one embodiment of a remote-controller with a cylinder-type physical configuration.

The present invention is now described with reference to the drawings.

Functional Overview

Simplified Example

FIG. 1 illustrates a functional overview of one particular embodiment of remote-control and/or interactive-control. The remote-controller 105 may include a pointer 102 that emits light-beam 111 that may form a pointer-spot 112 on/near objects within a pointer-spot detection-region 921. The user may orient the remote-controller 105 to move the pointer-spot 112 in-order to select and/or interact-with objects that appear within the pointer-spot detection-region 921.

In the embodiment shown in FIG. 1, an active-display 101 is within the pointer-spot detection-region 921. In the embodiment shown in FIG. 1, detectors and/or imagers (cameras 131 and 132) may be aligned to the display so that the imagers may detect the pointer-spot 112 when it is at any location with the display 101. In the particular embodiment shown in FIG. 1, the cameras (131 & 132) have an approximately 90 degree angular field-of-view (185 and 136) that allows the cameras to see the pointer-spot reflecting/scattering off any location within active-display 101.

Based upon operational context, the processing 106 may place control-menus and/or selection-options on the active-display 101, that the user may select and/or interact with. The control-menus and/or selection-options may be used to control one or more devices that are being controlled 108 [e.g., electronic-devices and/or user-devices]. In the example shown in FIG. 1, four objects ["option 1" 121; "option 2" 122; "option 3" 123; and "option 4" 124] may be [temporarily] displayed on the active-display 101 and represent options that the user may optionally select from.

To select an option, the user may activate the pointer-beam 111 and then orient the remote-controller 105 to place the pointer-spot 112 on [or near] one of the objects and then initiate a "select". The user may initiate a "select" via the user-control-interface 104. In one embodiment, the user-control-interface 104 may include control-button(s) 203 such as one or more mechanical switches that the user may press. For example, in one particular embodiment, a single switch/button may act as a very simple user-control-interface 104. As shown in FIG. 1, the user-control-interface 104 may be included in the remote-controller 105. The activation of a "selection", may be communicated 114 to the processing 106.

When the "select" is activated, the processing 106 may command the detectors and/or imager(s) to acquire one or more images that will allow the location of the pointer-spot to be determined. The captured-images may then be communicated 115 to the processing 106 where the image(s) are analyzed to determine the location of the pointer-spot at the time the "select" was activated. Using the pointer-spot location, the processing may then determine which selectable-object [e.g., menu-option] the user "selected". The processing 106 may determine the control-commands that need to be issued the appropriate device(s) 108 in-order to perform the control-action(s) that correspond to the user's "selection". The control-commands may be communicated 115 to the device(s)-being-controlled 108. Depending on the application and context, the processing may then cause a new set of menu-options or selectable-object(s) or entertainment programming to be displayed to the user on the active-display 101.

In some embodiments, media drive(s) 117 (e.g., a DVD or CD) and/or Internet/Network 118 interface may be optionally attached to the processing 106; in-order to provide [one-time] set-up and/or configuration-data and/or other information useful for controlling and interacting with various electronic-devices 108.

Figure 15:
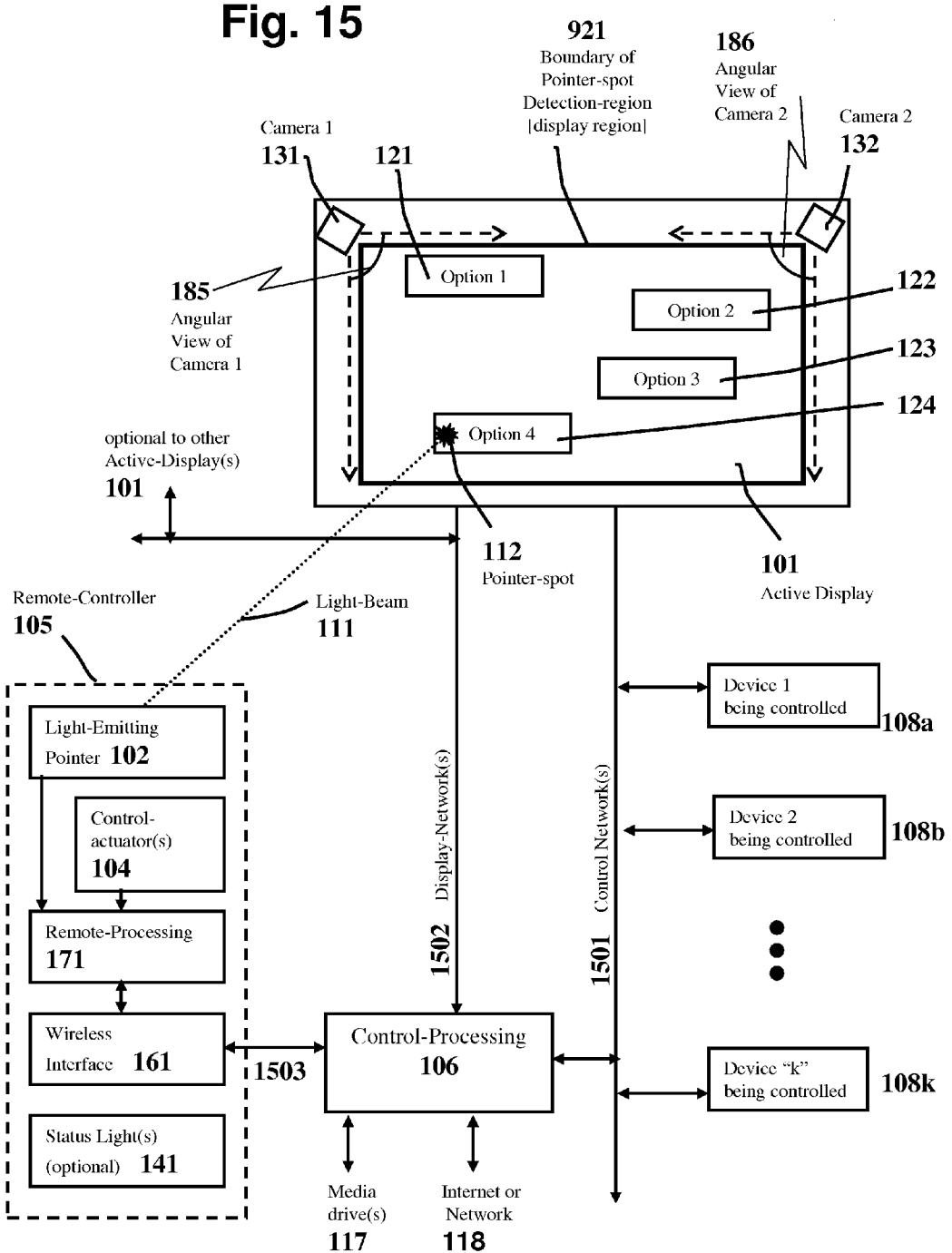
FIG. 15 illustrates a functional block diagram for one embodiment.

FIG. 15 illustrates a functional block diagram of one embodiment where the remote-controller 105 has a wireless interface 161 to the control-processing 106. As shown in FIG. 15, the remote-controller 105 may include a light-emitting pointer 102, one or more control-actuators 104, (optional) remote-processing 171, wireless interface 161, and optional status light(s) 141. The wireless interface 161 may communicate 1503 with control-processing 106.

In some embodiments, the remote-controller 105 may have only a single control-actuator (e.g., a pushbutton), so that a remote-controller 105 is very simple and intuitive to use (as there is only a single button to push).

In some embodiments, the user may press control-actuator(s) 104 to power-up/activate the remote-controller 105 and to cause the control-processing 106 to turn-on the active-display(s) 101 [for example, if they are not displaying anything, or are in standby/power-saving-mode]; and display selection-menus, on one or more active-display(s) 101.

More Generally:

Some configurations may have multiple active-displays 101 and/or detection-regions 921 that a user may place the pointer-spot 112 within. For example, the user may control all the devices in their home through any of the active-displays 101 distributed in several different rooms of their home. The user may own multiple remote-controllers 105 that may be interchangeably used with any of the active-displays and/or detection-regions 921.

In general, the user may select and/or interact with objects that are within the pointer-spot detection-region 921. In general, detectors and/or imager(s) may be attached/embedded in a display and/or display-frame so that they may see the pointer-spot 112 at any location within a pointer-spot detection-region 921. In general, the pointer-spot 112 may be used to designate and/or interact with object(s) on active-display(s) 101; fixed-display(s) 109; and/or real-world-objects.

In one embodiment, one or more imagers (e.g., cameras) may be integrated-with and/or attached to an active-display 101 and/or a display-frame 941; in order to detect the pointer-spot 112 on active-display(s) 101 and/or on fixed-object(s) 109 [e.g., real-world-object(s)].

In an alternative embodiment, detectors may be distributed [e.g., FIGS. 9e and 9f] across the region of an active-display(s) 101 and/or across fixed-object(s) 109 [e.g., real-world-object(s)]; in order to detect the pointer-spot 112.

By attaching and aligning the cameras and/or detectors to an active-display 101 and/or a display-frame during manufacturing, the user is not burdened with mounting; set-up; alignment and calibration associated with separately mounted camera(s).

In some retro-fit embodiments, the user may acquire a display-frame with camera(s) and/or embedded detectors. The display frame 941 may then be attached to an already owned active-display 101 or used to create a detection-region 921.

In general, the user may use the remote-controller 105 to control any type of electronic device. A single controller may also be used to control a plurality of devices 108 and/or interact with multiple active-displays 101 and/or fixed-displays 109. The remote-controller may be used to drag; pull and/or interact-with objects across multiple active-displays 101 and take actions on one screen that affect another screen.

In many embodiments, no surface or working area is needed to operate the remote-controller 105; even when performing the functions equivalent to those of a computer-mouse. This allows the user to easily orient the remote-controller from any position, including standing; sitting; reclining; lying on a couch; etc.

The invention may be used over a wide range of distances from the remote-control 105 to the active-display(s) 101 and/or fixed-object(s). In one embodiment, the invention may be used to controlling devices that are across a room in a work; home or other setting. The invention may also be used to interact with fixed or active/interactive real-world objects such as a billboard or display-advertisements.

In some embodiments, the invention may allow the simultaneous use of multiple remote-controllers by many different and/or unrelated users.

Remote-Controller Embodiments:

The remote-controller 105 may include a pointer 102; control-actuator(s) [user-control-interface] 104; and circuitry to allow communication 114 with the processing 106.

The remote-controller 105 may be integrated and sized to be easily oriented by the user to point the aperture-side of the remote-controller toward objects-of-interest. In some embodiments, the remote-controller may be mobile and portable. In some embodiments, the remote-controller may be configured to be easily held and oriented by the user. In some embodiments, the remote-controller may be transported in a user's pocket or worn by the user.

Figure 16:
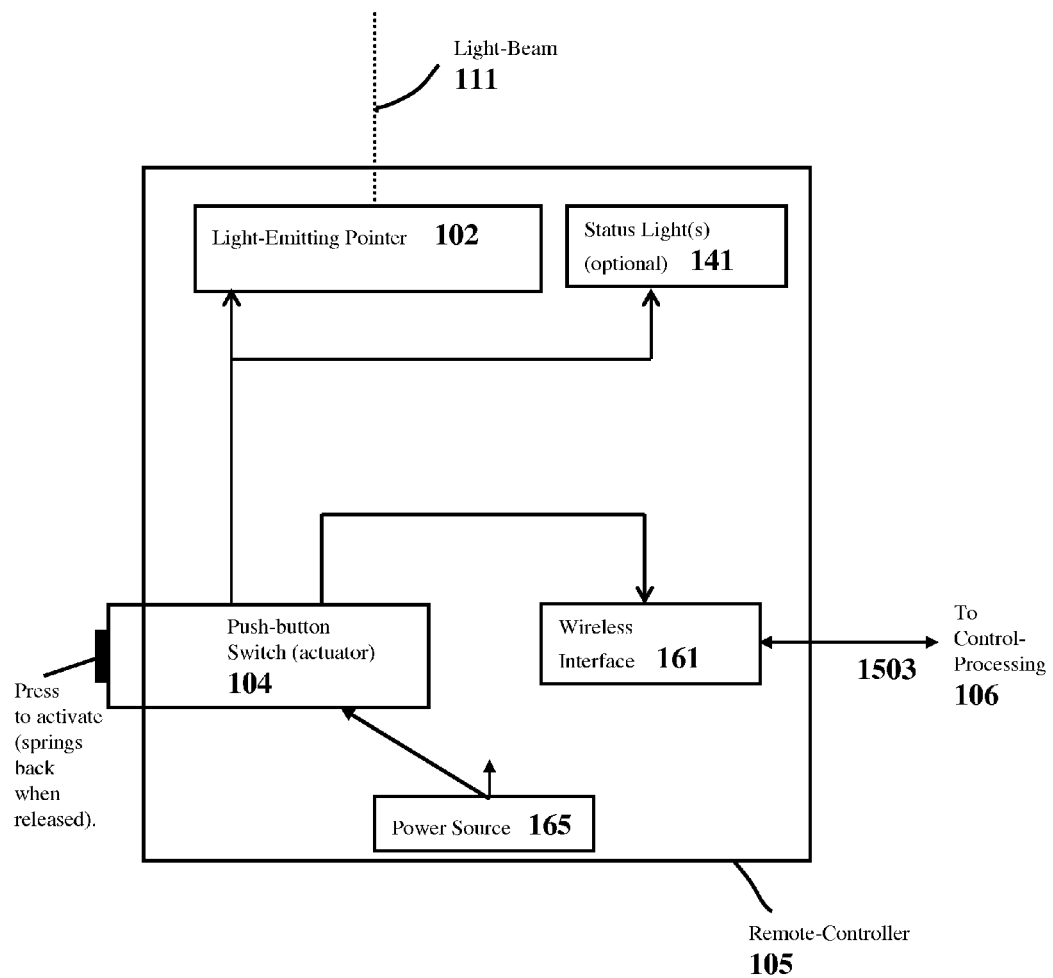
FIG. 16 illustrates a block diagram of one embodiment of the remote-controller.

FIG. 16 shows a block diagram of one embodiment (of many) of the remote-controller 105. As shown in FIG. 16, the remote-controller 105 may include light-emitting pointer 102; user-control actuator(s) 104 (e.g., a push-button switch); a wireless interface 161; optional status light(s) 141; and a power-source 165. The wireless interface 161 may allow communication 1503 with the control-processing 106. As shown in FIG. 16, the push-button switch (control-actuator) 104 may be pressed by a user to activate, and may spring back when released by a user. As shown in the embodiment of FIG. 16, remote-processing 171 may not always be needed, since connections from the switch 104 may be a) hard-wired to provide power to the light-emitting pointer 102 and b) hard-wired to the wireless interface 161, so an appropriate user actuation of the switch (control-actuator) 104 that corresponds to a "selection of an object", may be signaled to the wireless interface 161 and then communicated to the control-processing 106.

In one embodiment, as shown in FIG. 2a, the remote-controller 105 may have an approximately cylindrical-type shape, similar to a laser pointer or a pen. The pointer's output aperture 201 may be located and aligned at one end of the remote-controller. The remote-controller 105 may optionally contain a user-control-interface 104, such as control-button(s) 203. In one embodiment, the control-button(s) 203 may be mechanical-type switch(es) that the user may easily press with the thumb of the hand that is holding the remote-controller. The remote-controller's cross-section may be approximately circular or elliptical and may be variable along its length. The remote-controllers cross-section may be configured so that the control-button(s) are naturally aligned with the users thumb when held in the user's hand.

In one embodiment, the remote-controller 105 may have a single control-button 203 with three positions: "off"; "beam-on"; and "select" switch positions. The control-button 203 may be configured to automatically return to the "off" position when the user stops pressing-on the control-button 203 or sets down the remote-controller 105.

The shape of the remote-controller 105 may also be configured to prevent the remote-controller 105 from rolling when it is set down onto a flat or smooth surface (e.g., a table top). For example, the remote-controller may optionally contain a clip 205; that prevents the remote-controller from rolling on a flat surface and also allows the remote-controller to be clipped onto a shirt pocket or other objects.

Figure 2B:
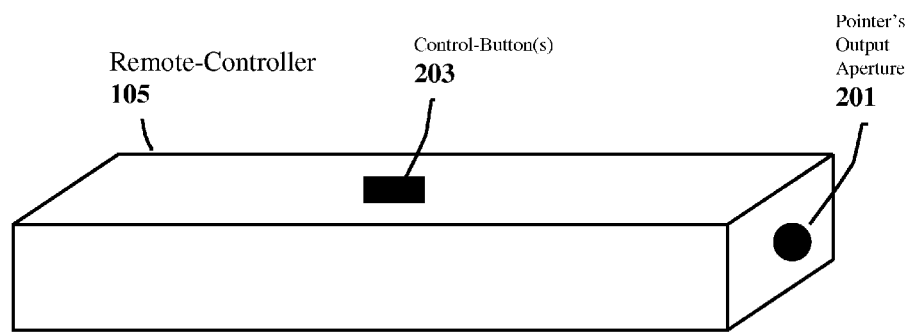
FIG. 2b illustrates one embodiment of a remote-controller with a rectangular-type physical configuration.

In another embodiment shown in FIG. 2b, the remote-controller 105 may have a square or rectangular cross-section [e.g., similar in shape to remote-controllers currently used for televisions; DVD-players; music-systems; etc]. The pointer's output aperture 201 may be located and aligned at one end of the remote-controller 105. The remote-controller 105 may also contain a user-control-interface 104, such as the control-button(s) 203.

In one embodiment, the control-button(s) 203 may be easily and naturally reached by the thumb of the same hand that is holding the remote-controller 105.

In some embodiments, the functions of remote-controller 105 may be added into many other existing devices. For example, the remote-controller 105 functions [102, 104, 114] may be incorporated into a pen; pencil; standard laser-pointer; cell-phone; personal digital assistant (PDA); or any other (mobile) device.

In another alternative embodiment, the remote-controller 105 functions [102, 104, 114] may be incorporated into any type of prior-art remote controllers. For example, the remote-controller 105 functions [102, 104, 114] may be also incorporated into a many-button remote-controller. In some embodiments, this may ease the transition from prior-art remote controllers to this invention since a user may continue to operate the old way or use the new invention, as desired.

In some other embodiments, the elements of the invention may be shared with other elements/capabilities that are normally included in other user-devices. For example, a pointer 102 may be added to cell-phones or personal digital assistant (PDA) or other mobile device. The processing 106 [or a portion of the processing] may also be shared in these multi-function devices. A pointer such as a laser-pointer or other light-emitting pointer may be incorporated into the phone. A button-switch or any other type of user-control may be used to turn-on the pointer and/or to "select" objects. The software may be imbedded in the phone and/or on other processors located elsewhere across a communication path 114 such as the cell-phone network and/or the Internet connection.

Figure 2C:
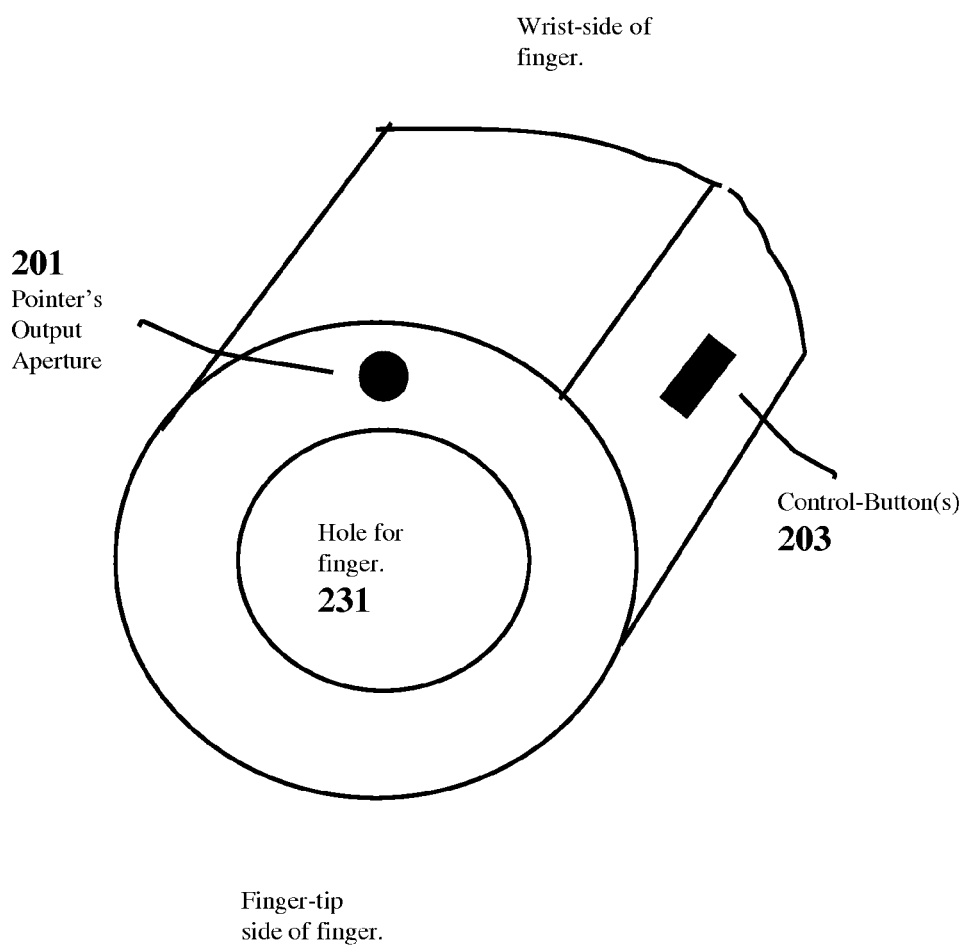
FIG. 2c illustrates one embodiment of a remote-controller with a ring-type physical configuration that can be worn on a user's finger.

In another embodiment, the remote-controller may be configured to be worn by the user. In one embodiment as shown in FIG. 2c, the remote-controller 105 may be shaped like a ring may be worn on a finger (e.g., the index finger). The remote-controller 105 may be ring-shaped with a hole 231 for sliding onto a user's finger. The size of the ring opening may be made to be adjustable to any size finger by using an elastic-band and/or adjustable Velcro-type strips for part of the ring. The pointer's output aperture 201 may be located at one end of the ring so it points away from the wearer's wrist. The remote-controller 105 may also contain a user-control-interface 104, such as control-button(s) 203. If the remote-controller shown in FIG. 2c is worn on the right-hand index finger then the right-hand's thumb (of the same hand that is wearing the ring) may easily activate the control-button(s) 203. The ring may also contain ornamentation as desired.

In some embodiments, the remote-controller 105 may be worn on one hand of the user, so that the user may be able to operate the control-actuator(s) 104 using the thumb of the same hand. FIGS. 2d through 2i show several examples of different physical embodiments of hand-wearable remote-controllers 105 that may be worn on a user's hand. Physical embodiments of the hand wearable remote controllers 105 may be configured to slide-on and slide-off of: one-finger (FIG. 2d; 2e); two fingers (FIG. 2f); three fingers; and/or four fingers (FIG. 2g).

Note that the pointer's output aperture 201 shown in FIGS. 2d to 2i, is located in the finger-wearable or hand-wearable remote-controller 105; so that the pointer's 102 light beam 111 is oriented away from the user, so that the user may easily place a pointer-spot 112 on objects that are in front of a user wearing the remote-controller 105. For example, the remote-controller 105 shown in FIG. 2c may be worn on the index finger of the right hand of a user as shown in FIG. 2d. As shown in FIG. 2j, the pointer's output aperture 201 may be configured so that when a user is wearing the remote-controller 105, the user may easily position the pointer-spot 112 on selectable objects (e.g., "Option 4" 124) within a pointer-spot detection-region 921.

Different users may have a varying preference for different shapes and sizes of a remote-controller 105 based upon a) ease of attaching or removing the remote-controller 105 from the user's hand b) comfort when wearing c) ability to do other activities while wearing the remote-controller 105 and/or d) many other user factors. For example, a user may want to be able to type on a keyboard or write with a pen/pencil while the user is wearing a remote-controller 105d-105i. In addition, the choice of a wearable physical configuration may be based upon on the cost of various sizes and shapes of the many possible configurations of remote-controllers 105. For example, smaller size remote-controller 105 configurations may result in higher costs and/or smaller size batteries with a shorter discharge lifetime. It is expected that the cost of producing a given size remote-controller 105 is expected to decrease over time.

Note that in some multi-finger embodiments, the remote-controller 105 may have a single opening that can accommodate a plurality of fingers. In alternative multi-finger embodiments, the remote-controller 105 may have a plurality of openings to accommodate individual fingers (similar to how a glove has an opening for individual fingers). In other multi-finger embodiments, the remote-controller 105 may be incorporated into a glove or mitten configurations. In some glove/mitten embodiments, the finger ends of the glove/mitten may be left open (similar to bicycling gloves) so the bare fingers are exposed; and the fingers are accessible to more easily handle and/or touch objects.

A wearable remote-controller 105 may have one, two, three or more control-actuators 104 such as push-buttons; switches, etc. FIGS. 2d, 2e, 2f, and 2g show a few examples of a wearable remote-controller 105 with only a single control-actuator 104 (e.g., a single push-button switch) which is reachable by a user's thumb. FIG. 2h shows an example of an embodiment of a wearable index-finger-ring remote-controller 105h that has two control-actuators 104h (e.g., two push-buttons switches) which are both reachable by a user's thumb. FIG. 2i shows an example of an embodiment of a hand-wearable remote-controller 105i that has two control-actuators 104i (e.g., two push-buttons switches) which are both reachable by a user's thumb.

In the physical embodiment shown in FIG. 2d, the remote-controller 105d may be shaped similar to a ring that may be worn on an index finger of a user. If the remote-controller shown in FIG. 2d is worn on the right-hand index finger then the right-hand's thumb (of the same hand that is wearing the ring) may easily activate the control-actuator(s) 104d. The remote-controller 105d may be ring-shaped with an appropriate size hole or an adjustable size hole, for sliding on/off a user's finger.

The size of the remote-controller opening may be made adjustable and able to comfortably fit to a wide range of sizes needed by people of different sizes. For example, the finger size of the ring remote-controller (102d-102e) opening may be made adjustable and able to comfortably fit to a wide range of sizes needed by different sized people. In one physical embodiment, the size of the ring opening may be made adjustable for different sized users by use of an elastic-band whose loop length is adjustable. As another embodiment, the size of the ring opening may be made adjustable with attachable/detachable Velcro-type strips used for part of the ring's circumference. In other embodiments, combinations of elastic strips and Velcro-type strips may be used for parts of the ring's circumference or loop. In some embodiments, the loop may be made adjustable over an even larger range so that the remote-controller 105 may be adjusted by the user to fit over one; two; three and/or four fingers of the user, so that each user may chose their most comfortable configuration of wear the remote-controller 105. In some embodiments, once the loop length or circumference has been adjusted to a user, that adjustment/opening size may be maintained, even when the user removes and/or re-installs the remote-controller 105 on their hand.

One advantage of such wearable remote-controllers 105d-105i is that the remote-control 105 may remain attached to a user and hence readily available for remote-control actions. Unlike prior-art handheld remote-controllers, the user does not need to set the remote-controller aside after completing the desired control operating and then, at a later time, go hunting around to re-locate the remote-controller, in-order to operate the remote-controller.

In some embodiments, the shape of a wearable remote-controller 105 may be configured to allow the control-actuator(s) 104 to be naturally aligned with the thumb of the user. For example, in the embodiment shown in FIG. 2e, the shape of the remote-controller may be varied for a natural alignment of the thumb with the location(s) of the control-actuator(s). The location of the actuator(s) on the remote-controller 105 and their operational stiffness may be chosen so as to minimize a user accidentally activating the control-actuators 104 when not intended by the user.

The shape of the remote-controller 105 may also be configured with gripping points for the fingers of the other hand (e.g., non-wearing hand), to allow a user to more easily slide the remote-controller 105 both on and off the user's wearing hand.

In some embodiments, the shaped remote-controller 105 may be configured, so that the same remote-controller 105 may be worn on either the right-hand or left-hand of a user, while still allowing the control-actuator 104 is easily accessible by the thumb of the hand the remote-controller is being worn on. That is, the same remote-controller 105 may be worn and easily operated when on either a user's right-hand or left-hand. In other embodiments, specialized configurations may be employed that are intended for only the right-hand or only the left hand of a user.

The remote controller 105 may also contain a power source (for example, a battery). The remote-controller 105 may be configured to minimize power consumption in-order to allow the use of smaller size batteries and/or provide a longer time between battery replacement/recharge. For example, the remote-controller 105 may automatically enter a reduced/lower power state when no user activity is detected for a defined time-period.

As an option, a ring and/or hand-wearable configuration may also contain any of various types of jewelry-type decorations and/or ornamentations, beyond that which is required for functionality.

Many other wearable configurations are also possible. For example, the remote-controller function may be:

Embedded in a wrist-like device such as a bracelet or a watch worn by the user

Embedded in the user's clothing.

Embedded or attached to the user including implanted in the skin.

In even other embodiments, the functions of a remote-controller 105 may be added into many other existing devices. For example, the remote-controller 105 functions [102, 104, 171, 161] may be incorporated into a pen; pencil; standard laser-pointer; cell-phone; personal digital assistant (PDA); or any other (mobile) device.

In other optional alternative embodiments, the elements [102, 104, 171, 161] of a disclosed remote-controller 105 embodiments may be shared with other elements/capabilities that are normally included in other user-devices. The remote-processing 171 and wireless interface 161 may also be shared with other functions that may be included in these multi-function devices. In other optional alternative embodiments, the remote-controller 105 functions [102, 104, 171, 161] may be incorporated into any type of prior-art remote controllers. For example, the remote-controller functions may be also incorporated into a prior art infrared-universal-remote-controller such as those that are similar to those show FIG. 0. In some embodiments, this may ease the transition from prior-art infrared-remote-controllers, since a user may either continue to operate the old way (by press the many buttons on the remote) or use one button of the presently disclosed embodiments.

In an optional alternative embodiment, the remote controller may be mounted on a stand or tripod so it may be easily accessible to the user and may be easily oriented to point at objects-of-interest.

User-Control-Interface Implementations:

In general, the user may communicate with the processing 106 via the user control-interface 104. Depending on the embodiment, the user control-interface 104 may utilize physical-controls such as buttons; switches; scroll-wheels; keyboards; etc. In other embodiments, verbal/audio-commands and/or any other method of inputting a user-command (e.g., "select") may be used. In some embodiments, the user-control-interface may implement the functional equivalent of a computer-mouse [e.g., with equivalents to the right and left mouse buttons; scroll-wheel; etc.].

In some embodiments, as shown in FIG. 1, a user control-interface 104 may be physically packaged with the remote-controller 105. In other embodiments, the user control-interface 104 may be packaged outside the remote-controller 105 and may communicate over a communication path (such as 114 or 115).

In embodiments where the user only needs to make "selections", the user-control-interface 104 may comprise a single "select" switch/button (e.g., 203) or control-input (e.g., single audio-command/sound). Example applications include controlling televisions; DVD-players; cable-boxes; Digital-Video-Recorders (DVR's); home-theater-systems; music-systems; appliances; security systems; heating/cooling systems; thermostat; lights (on/off; dimming); closing shades; etc. The processing 106 may be notified [via communication path 114] whenever the user activates a "select" (e.g., "clicks" the select-button). FIGS. 2a through 2c show examples of some possible locations for a physical "select" button 203.

In one embodiment, whenever the user first activates (e.g., "clicks" the select-button or issues an audio-command):

the pointer-spot may be turned-on and/or the control-display(s) may be automatically turned-on and/or selection-menu(s) may be presented on the active-control-display(s) 101.

Depending on the embodiment, the displayed selection-options may be a default [e.g., high-level] menu or may be related to the current system context. The pointer-beam 111 and/or the displayed selection-options may be activated for only a pre-defined time [e.g., 5-20 seconds] after the user has pressed the "select" button. The length of the predefined time-out may be independently optimized for each application and/or context. The pointer-beam 111 and/or active-control-display 101 [e.g., menu-options] may be kept on, as long as the user continues to make selections within the pre-defined time-out period.

In one embodiment, a valid "select" may be assumed to occur only when the user activates a "select" (e.g., "clicks" the select-button or issues an audio-command) while both the pointer-spot is turned-on and selection-options are available on the active/passive display(s). When a valid "select" request is made, the detectors and/or imager(s) may capture one or more images of the pointer-spot 112 location. For example, the special case of initially pressing the "select" button to turn-on the pointer-beam and the control-display(s) 101 is not interpreted as a control-action by the processing 106.

In an alternative embodiment, a multi-position-control switch (e.g., 203) may be used. In one embodiment, the three switch positions may be:

pointer-beam and control-display are both off (off-position).

pointer-beam and display-menus are both activated; to allow the user to move the pointer-spot to the desired selection-option.

the "select" position: pointer-beam on and the detectors/imager(s) acquire one or more images of the pointer-spot 112.

The three-position button/switch may be spring loaded so that it automatically returns to the off-position whenever the user is not pressing on it. The three-position-button may provide the user with greater control over when the control-selections are being displayed on the active-control-display 101 [since the user is not bothered by the automatic time-outs used in some of the other embodiments].

FIGS. 2a and 2b provide examples of the use of control-button(s) 203 in hand-held remote-controllers 105. The control-button(s) 203 may be positioned on the remote-controller 105 so that they may be activated using the thumb of the same hand that is holding the remote-controller 105. FIG. 2c shows an example of the use of control-button(s) 203 in a wearable remote-controller 105.

The user-control-interface 104 may also be implemented to accomplish any desired set or subset of computer mouse functions. Moving the cursor may be easier than with a computer-mouse; since the cursor-location may be immediately defined by the position of the pointer-spot when a "select" occurs. In addition [unlike a computer-mouse], a surface is not needed since the user simply orients the remote-controller 105 to position the pointer-spot 112 at the desired cursor location.

Other equivalent computer-mouse functions may be optionally incorporated into the user-control-interface 104. For example, the equivalent of a left mouse button may be accomplished by the "select" button of the user-control-interface 104. Following a selection, the computers active-location (e.g., a blinking symbol) may then be moved to (e.g., indicated at) the location that was "selected" on the active-display 101; or the "selected" object may be highlighted on the active-display 101.

Similarly, the equivalent of a right mouse button [that may cause a set of menu-options to pop-up] may be accomplished with another button [or switch position] 203 in the user-control-interface 104.

Scroll-wheel(s) similar/equivalent to those computer-mouse [e.g., to change what is shown in a display window] may also be optionally included in the user-control-interface. In one embodiment [supporting one handed operation], the buttons and scroll-wheels included in the user-control-interface 104 may be positioned on the remote-controller 105 so that they may be activated using the thumb of the same hand that is holding the remote-controller 105.

The equivalent of a mouse drag-and-drop function may be accomplished by holding the "select" button down once the pointer-spot is at the object-of-interest and then moving the pointer-spot to the new desired location and then releasing the "select" button. The detectors/imager(s) may capture an image when the "select" button is initially pressed and again when the "select" button is released [and perhaps at intervals in-between]. Other computer mouse functions: including selection-of-area; or selection-of-text or designation of the location-of-action, may also be similarly implemented. Distinguishing between a "single-click" and a "double-click" and between the "press-down" and "release" of a button(s) may also be useful in some embodiments.

In some embodiments, a keyboard or other display of alpha-numeric characters and/or symbols [e.g., a virtual-keyboard] may be temporarily presented on the active-display 101; so the user may select a sequence of the symbols as a control "input". For example, when in a channel selection mode; an active-display 101 may show a virtual-keyboard with the numbers 0 thru 9. The user may then use the pointer-spot 112 to select a sequence of numbers to go to a specific channel (e.g., select "3" then "5" then 1" to go to channel 351). The numbers may be shown in their selected sequence on a portion of an active-display 101, so the user can verify what is happening (e.g. "35_" may be displayed after the first two selections have been made).

In some embodiments, a special area may be (temporarily) placed on the active-display 101 for the user to draw "input" symbols using the pointer-spot. For example, the user may draw alpha-numeric characters or symbols with the pointer-spot 112 within a predefined area on the active-display 101. A sequence of images containing the pointer-spot may be captured by the detectors/imager(s) and processed to extract the pattern or shape that the user has drawn with the pointer-spot. The processing 106 may then combine/connect the "spots" to determine the character that the user had drawn out. Alternatively, the detectors/imager(s) may use an increased integration-time so the pointer-spot is captured by [e.g., "smeared"] across many detector elements that see the pointer-spot's path of movement.

In some embodiments, the user may issue commands by moving the pointer-spot to create a predefined pattern or symbol. For example, the user may map out an "M" pattern with the pointer-spot to indicate a pre-defined request (e.g, "M"=a specific-command).

In other alternative embodiment, portions of the user-control-interface 104 may include voice-recognition or sound-recognition. For example, the control-interface 104 may respond to words or phrases or sounds from a user. For example, the user may say "menu" and a control-menu may be automatically shown on the active-display(s) 101 and the pointer-beam may be activated. After the user has placed the pointer-spot on the desired selectable-object(s); the user may say "select", which may then cause the detectors and/or imager(s) to acquire one or more images. When the user says "done", the pointer-beam and control-menus may be automatically de-activated. The remote-controller 105 may have a microphone to capture the sound; an analog-to-digital converter; and processing to recognize specific words or phrases or sounds (e.g., verbal commands).

In another optional embodiment, the user-control-interface 104 may be simplified by including sensors within the remote-controller 105 to detect when the user is actively using the remote-controller 105. For example, the pointer 102 light-beam 111 may be automatically activated whenever sensor(s) embedded within the remote-controller sense that the user is holding or using the remote-controller 105. This may eliminate the need for a distinct pointer-beam-on and/or control-menu-on control within the user-control-interface 104. Examples of sensors that may be incorporated into the remote-controller to automatically control the pointer-beam and control-menus include:

Heat or thermal sensor(s) to detect heat from the user's hand.
   Motion sensor(s), such as accelerometer(s), to detect that the user is moving the remote-controller 105.
   Pressure sensor(s) to detect that the user is holding/orienting the remote control.

In addition, the pointer-beam may be automatically deactivated after a predefined time-period without detected user activity [e.g., 20 seconds].

Any combination of these and other methods may be used for the user-control-interface 104.

Pointer Implementations:

In general, any method of pointing at objects-of-interest that may be observable by both the user and the detectors/imager(s) may be used.

In one embodiment, the pointer 102 is a light emitting device, capable of emitting light that will be easily visible to both the user and the detectors/imagers either directly or when reflecting off objects-of-interest.

In one embodiment, the pointer-spot may form a spatial pattern in the form of a small dot or disk shape when reflected off an object-of-interest or other objects that are near an object-of-interest.

The pointers output power; wavelength; and beam focus may be chosen with consideration of human eye safety and the safety of any objects that may be illuminated by the pointer.

The illumination output from the pointer may be focused so that at all distances from the pointer to an object-of-interest, the pointer-spot is easily observed by both the user and the detectors/imager(s).

In one embodiment, a portion (or all) of the pointer's emission wavelengths may be directly visible to the unaided human eye (e.g., in the range of ~0.4 to ~0.8 um) and also detectable by the detectors/imager(s). In another embodiment, the pointer-device's emission wavelength range is limited to a narrow range of wavelengths (e.g., red) within the visible region of the unaided human eye.

In one embodiment, the pointer 102 may utilize components similar to visible the laser-pointers [e.g., a red laser-pointer] that widely used to point at locations in viewgraphs, poster-boards, etc during a presentation.

In an alternative embodiment, the pointer-beam may contain both visible light (e.g., that the user can see) and non-visible light (e.g., that the detectors/imagers can see); where both are aligned to occur at the same pointer-spot location 112. The wavelengths and bandwidth of the non-visible light from the pointer-spot 112 may be chosen to minimize the amount of stray light [e.g., ambient and/or emitted from the display] that will reach the detectors/imager(s). An optical filter may be placed before the detectors/imagers to only pass the band of non-visible light that is emitted from the pointer 102.

In another embodiment, the pointer-beam's 111 wavelength range may be totally outside the visible range of the human eye (e.g., in the non-visible wavelength ranges). The detectors 951, imager(s), and/or camera(s) [e.g., 131-139, 971, 972, 991] may detect a pointer-spot 112 that is not visible to the human eye. For this embodiment, the detected location (e.g., by the detectors) of the non-visible (to a user) pointer-spot 112, may then be indicated by a cursor that is displayed on an active-display 101 that is visible to a user.

In another alternative embodiment, the pointer-beam's 111 wavelength range may be totally outside the visible range of the human eye (e.g., in the non-visible wavelength ranges). A user operating a pointer 102, may wear special eyeglasses [or utilize other equipment] that re-maps the invisible pointer-spot 112 into wavelengths that the user can see. This may be useful for cases where a visible pointer-spot may interfere with other users that are also viewing the detection-region 921 [e.g., the display region] with the naked eye. In this way, other users (without the proper equipment) will not be distracted by the pointer-spot 112.

In some embodiments or modes of operation, the pointer's light beam 111 may be modulated or cycled in a known on-off pattern [possibly under the control of the processing 106] to support capabilities such as:
  Allow the user to see objects that are "underneath" (e.g., hidden-by) the pointer-spot; when the pointer-spot temporarily shuts off.
  Reduce pointer power usage (e.g., extend battery-life).
  Distinguish between multiple pointers that may be simultaneously operating.

In some alternative embodiments, one user's pointer-spot 112 may be distinguishable from other user pointer-spots. Methods used (separately or in combination) to distinguish between multiple pointer-spots may include:
  Wireless communication (of an ID or codes) from the remote-controller to the processing 106.
  Variations of the pointer output under the control of the processing 106.
  Differences or variations in the pointer's wavelengths or colors.
  Modulation of the pointer wavelength, color or intensity of the pointer's light output with time [e.g., pointer-unique on-off; flashing; or pseudo-random pattern(s)].
  Different spatial patterns or shapes of the pointer-spot 112 (e.g., circle, square, diamond or multiple-dot patterns).

In another alternative embodiment, the pointer 102 may project light over the full field-of-view of the detector(s) and/or imager(s) except for a small "spot without light" (e.g., a dot of "shadow/darkness") where the "shadow-spot" represents the pointer-spot. The region around the "shadow-spot" is illuminated by the pointer's light output. In an example embodiment, the pointer's light output may be similar to a spotlight or flashlight except for a small "spot" without light ("shadow-spot) is created near the center of the pointer's light output. This may be useful for cases where no ambient light is available to illuminate the detection-region 921 [e.g., display region] where the user is trying to locate objects-of-interest.

Optional Status Light(s) on Remote-Controller:

As an option, the remote controller 105 may also contain one or more status lights 141. For example, the remote controller may contain an "on/working" or "working/active" light (e.g., an LED) in-order to indicate to a user that the unit is: powered-on; functioning normally; and/or properly communicating with control-processing 106. To conserve power, the optional "on/working" light may light-up or may flash, only when the remote-controller 105 is being activated by the user and/or communication is verified as properly occurring with the control-processing 106. In one embodiment, when the user actuates a control-actuator 104, the status light 141 may flash "on" to indicate to the user that command/control information has been sent by the remote-controller 105 to the control-processing 106 and that the remote-controller 105 has received back from the control-processing 106 a communication that the commands were successfully executed.

Detector and Imager Implementations:

The detectors and/or imager(s) may be capable of imaging the pointer-spot at any location within the pointer-spot detection-region 921 [e.g., display region]. In some embodiments, area-array imager(s) similar to a still-image-camera or a video camera may be mounted or attached to an active-display 101 or a display-frame 941 so the reflection of the pointer-spot 112 may be detected anywhere within the region of pointer-spot detection. In other embodiments, line imagers may be used. In other embodiments, detectors may be distributed across the detection-region 921 and/or across objects within the detection-region 921. Details for each these approaches is discussed in the following sections.

In some embodiments, the detectors and/or cameras may be activated to sense the pointer-spot 112 when initiated by a user action [e.g., "select"] or when initiated by the processing 106. In some embodiments, the detectors and/or imager(s) may acquire a single image whenever the user initiates a "select" at the user-control-interface 104. In some other embodiments or situations, the detectors and/or imager(s) may take multiple images [e.g., when the user is moving the pointer-spot 112 to "select" a region or group-of-objects].

The number of detectors and/or cameras that are used may depend on:
  The dimensions of the detection-region 921.
  The location accuracy of pointer-spot detection required by the application [e.g., finer spatial resolution may require more detectors].
  Whether the display is curved; flat; 2-dimensional or 3-dimensional.
  The acceptable thickness of the display along with the connected/attached detectors/cameras.

In some embodiments, a band-pass optical filter that only passes certain wavelengths emitted by the pointer; may be placed in-front of the detectors and/or imagers. For example, if a narrow-bandwidth red laser pointer is used in the remote-controller 105; then the optical filter may pass only those red-light wavelengths that are emitted by the pointer. Use of the optical filter may:

Allow easier detection of the pointer-spot;

help to improve the detector signal-to-noise ratio; and reduce false-detections by decreasing the amount of stray light that may reach the detectors.

Viewing the Pointer-Spot Using Camera(s):

One or more cameras may be attached-to or integrated-into the structure around the display region [e.g., a display-frame 941], so that the detectors within the camera(s) may "see" the pointer-spot 112 as it reflects-off active-display(s) 101; fixed-display(s) 109; and/or real-world-objects located within a display-region 921.

Note that although some of the following examples may show a detection-region 921 that is the same as an active-display 101; in general any combination of active-display(s) 101; fixed-display(s) 109 and/or real-world-object(s) may appear within the display region [e.g., detection-region 921].

FIG. 8*a* shows an example where two cameras (131, 132) are integrated-into or are attached to the display-frame 941 of an active-display 101. The cameras (131, 132) are located above the display's surface so they will have a view of the pointer-spot when it reflects off an object in the display region. In some embodiments, to minimize the display-frame thickness, the cameras (131, 132) may be located just above the display surface so each detector in a camera may have a shallow viewing angle. As shown in FIG. 8*a*, each detector in a camera may have an angular-field-of-view of a slice of the detection-region 921, where the size of the viewed region may be pie-piece shaped and may increase significantly with the distance from the cameras (131, 132). For example, one detector in camera 1 (131) may have a view of region 871 while one detector in camera 2 (132) may have a view of region 872. The region 875 in the display region may be defined by the simultaneous view by one specific detector in camera 1 (131) and one specific detector in camera 2 (132). When the pointer-spot is within region 875 of the display region, the reflected pointer-spot may be simultaneously visible to one specific detector in camera 131 and one specific detector in camera 132. The camera optics and number of detectors in the cameras may be used to meet a desired spatial resolution [e.g., maximum size of a region 875] that is appropriate for a specific application. Depending on the camera height 862 and the optics-design, the cameras (131, 132) may utilize either an area-array or a line-array of detectors. Line 821 in FIG. 8*a* shows the location of the cross-sectional view that is illustrated in FIG. 8*b*.

FIG. 8*b* shows a cross-sectional view 821 (see FIG. 8*a*) of the display-frame 941 and the active-display surface 851 showing an example where the cameras (131, 132) may be mounted on the upper portion (853, 855) of the display-frame 941. In some embodiments, to minimize the thickness 861 of the display-frame 941, the cameras may be located a small distance 862 above the display-surface 851, so that the cameras may have a relatively shallow viewing-angle of the active-display 101. A protective cover 854 may surround the back and sides of the active-display and be used to provide additional structural integrity.

Note that although FIGS. 8*a* and 8*b* illustrate an embodiment with an active display type structure 852 [e.g., a liquid crystal display panel], in other embodiments images may be projected [e.g., projection displays] into a surface [e.g., a wall or screen] in the display region that is defined by a detection region 921 and/or a display-frame 941.

Figure 10:
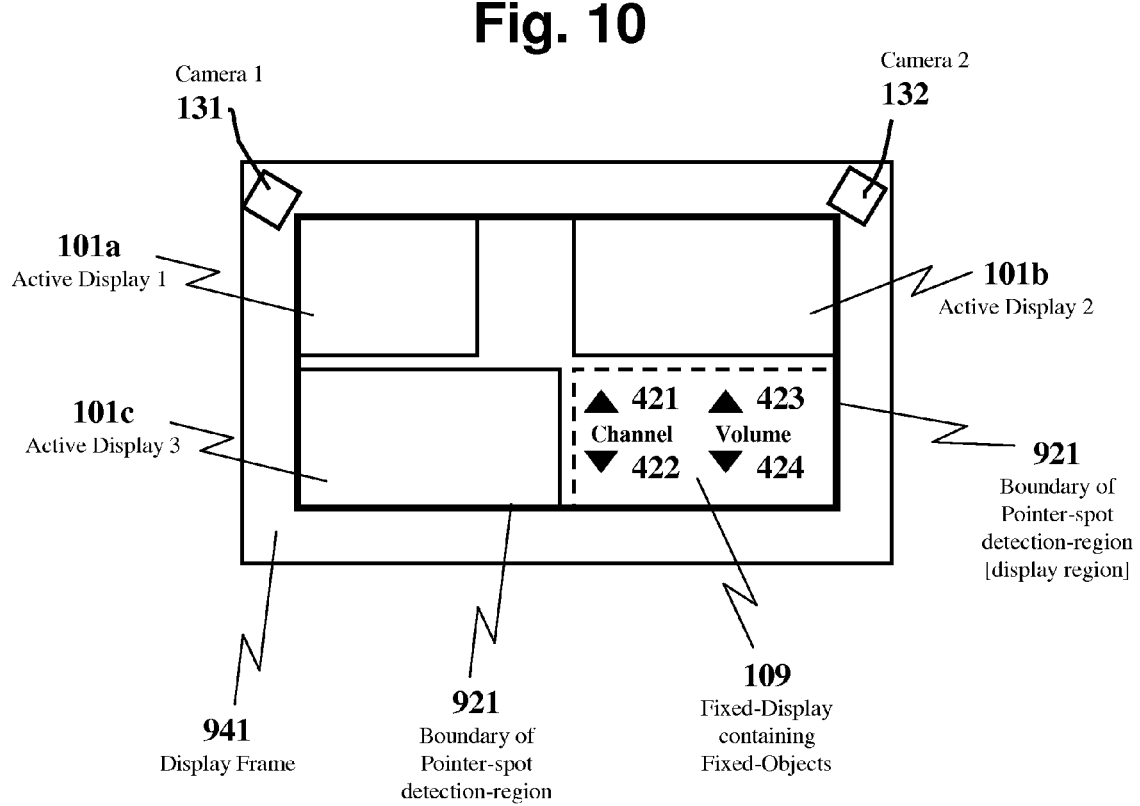
FIG. 10 shows an example where there are three active-displays 101 and a fixed-display 109 containing a plurality of fixed-objects, located within a display region [e.g., pointer-spot detection region] defined by a display-frame.

FIG. 10 shows an example where three active-displays [101*a*, 101*b*, 101*c*] and a plurality of fixed-objects 109 [e.g., 421, 422, 423, 424] are located within a pointer-spot detection-region 921 [display region] defined by a detection region 921 or display-frame 941. For example, all of these displays and fixed-objects may be packaged together in a cabinet or common assembly. In this example, two cameras (131, 132) may view the pointer-spot 112 wherever it is placed on any of the active-displays 101 and on any of the fixed-display 109 objects. Note that any of the active displays 101 in these examples may be any type of active display 101 including projection type displays.

FIG. 9*a* shows an example utilizing a line of detectors along the X-axis and Y-axis [971 and 972 respectively] that are attached to the active-display 101 or display-frame 941. Optics in front of the detectors may allow each detector to view a narrow slice [982, 983] of the pointer-spot detection-region 921. The area viewed [981] by both an X-axis and a Y-axis detector may be used to determine the location of the pointer-spot 112.

FIG. 9*b* shows an example utilizing a single area-view camera that is attached to the active-display 101 or display-frame 941. The camera 991 may be attached to the active-display 101 and/or display-frame 941. The height of the camera above the detection-region 921, may need to be higher than some of the other multi-camera embodiments, in-order to obtain sufficient spatial resolution [e.g., reduced image warping]. In some embodiments, the camera(s) may be mounted on a camera-assembly that is attached-to and/or pops-out from the display-frame 941, in a manner that allows calibration of the detector viewing-locations during manufacture. The camera assembly may be manually popped-out by the user once during initial set-up or may be automatically deployed during remote-control operation.

FIG. 9*c* shows an example utilizing multiple cameras positioned along both the X and Y axis of the active-display 101 or display-frame 941. Each camera may have a view of a portion of the display region. For example, camera 2 (136) may have a view 188. Each detector in the cameras may view a portion of the detection-region 921. In some embodiments, the pointer-spot location may be determined by the common area that is viewed by an X-axis detector in cameras 135, 136 or 137 and by a Y-axis detector in cameras 138 or 139.

FIG. 9*d* shows an example utilizing cameras (131, 132, 133, 134) attached at the four corners of the display-frame 941. In one embodiment, each camera may have an approximately 90 degree field-of-view (e.g., 185). Compared with FIG. 8*a*, the additional cameras may be utilized to increase the spatial resolution of pointer-spot within the display region [e.g., detection-region 921].

Reflected-Light from Pointer-Spot Versus Imager Viewing-Angle:

For embodiments that use a camera(s) to detect the pointer-spot reflection off objects, the amount of light that is reflected may vary as a function the viewing-angle of the camera(s). For flat surfaces, the amount of reflected pointer-spot light may decrease significantly when the imager(s) are looking at a small angle relative to the object surface. Irregularities in the display-screen or object surfaces may be used to improve pointer-spot visibility at such shallow viewing angles. Many types of active-displays naturally contain irregularities [e.g., layers of films and pixel structures] that act as tiny reflectors that will disperse the pointer-spot toward the imager(s) and improve detection of the pointer-spot at shallow viewing-angles.

In some embodiments, additional small structures that may act like angle-reflectors may be embedded within or attached-to the display screen [during display manufacture or retrofitted later] to improve pointer-spot detection at shallow viewing-angles. The angle-reflector structure(s) may be designed to minimize the degradation of the normal display image quality. In one alternative embodiment, a substrate [e.g., a clear-plastic sheet] with very small embedded angle-reflectors may be attached to the display surface to improve pointer-spot visibility at shallow viewing angles. The angle reflector structures may be designed to optimize the reflection of pointer-spot wavelengths but to minimally impact the display wavelengths. For example, the reflector size [relative to pointer-spot wavelengths] and optical coatings/filters may be employed. This may be more easily accomplished for embodiments where the pointer-spot includes non-visible wavelengths (in addition to visible wavelengths).

Similarly, existing displays may be retro-fitted to become more reflective by attaching a substantially transparent substrate containing angle-reflectors [or other type reflectors] onto an existing display's surface. For example, a flexible clear plastic sheet containing angle-reflectors and with an adhesive backing may be affixed to the front of an existing display to improve its reflectivity at shallow viewing angles. The impact on the viewed display sharpness may be minimized. Many existing displays may contain enough films/layers to reflect sufficient pointer-spot light to the imager(s) even at shallow viewing angles so that such special reflectors may not be needed.

Similarly, when needed, the roughness and surface characteristics of fixed-objects and real-world-objects can be designed to allow improved reflectivity of the pointer-spot at shallow viewing-angles.

Camera Implementations:

In one embodiment, the detectors may be embedded in one or more cameras that are attached to the display-area and/or to a display-frame. Depending on the embodiment, area-array and/or line-array sensors may be used.

The cameras may be made both small and low power by utilizing integrated circuit technology such as:

Line(s) and/or area-array(s) of light sensitive semiconductor diodes and/or transistors.

Active Pixel Sensors (APS's) including those based on CMOS or MOS semiconductor technology.

Line(s) or area-array(s) Charge Coupled Device(s) (CCD's).

Optics may be used to focus the image onto the image sensor(s). The imager's focus-distance and field-of-view may be configured to allow imaging of the pointer-spot 112 at any location with the pointer-spot detection-region 921.

Depending on the embodiment, the wavelength sensitivity range(s) of the detectors/imager may be capable of detecting at least a portion of the illumination wavelengths of the pointer-spot as it is reflects off objects in the detection-region 921.

Depending on the embodiment or mode, the detector/imager illumination-sensitivity may be able to accommodate:

Variations in the intensity of the pointer-spot at differing distances from the pointer 102 to the displayed objects.

Variations in the reflectivity of the pointer-spot with camera viewing-angle and the when reflecting-off different types of objects.

Detect modulations of the pointer's intensity in-order to distinguish between multiple pointers (if used).

In some embodiments, the detectors/imagers may also include capabilities to prevent blooming due to the excessive reflected light from pointer-spot and/or "glint" from mirror-type reflection effects.

In some embodiments, only a single image may be acquired per user action (e.g., "select"). In other embodiments, a sequence of images may be acquired by the detectors/imager(s) based upon user action(s). The sampling time(s) and sampling rate may be automatically timed and/or sequenced and/or varied under the control of the acquisition software and/or processing 106. In other embodiments or modes, the imaging-rate (i.e., temporal sampling rate) may be uniform and/or variable.

Depending on the embodiment or mode, the spatial resolution (e.g., spatial sampling) of the detectors/imager(s) may be fine enough to:

Determine the pointers-spot location on the active-display 101 or fixed-display 109 with an acceptable precision.

Distinguish details of the reflected pointer-spot to uniquely distinguish between pointers with different pointer-spot patterns (when used).

Viewing the Pointer-Spot Using Distributed Detectors:

In another alternative embodiment, detectors capable of imaging the pointer-spot may be distributed across the pointer-spot detection region 921. In the example embodiment shown in FIG. 9e, detectors may be distributed throughout the active-display-area 901 of an active display 101 or a pointer-spot detection region 921. FIG. 9f shows one detailed embodiment of the region 931 shown in FIG. 9e. Note that in general the distributed detectors may cover a portion of the display region [detection-region 921], while camera(s) are used to image other portions of the display region [detection-region 921].

FIG. 9f shows one example of a pattern of the detectors 951 that may be distributed within the pointer-spot detection-region 921. Note that in general, the detectors may be distributed across active-display(s) 101, or across fixed-display(s) 109 or across fixed-object(s) or across real-world-object(s). The spacing between the detectors 951 may be made less than the minimum pointer-spot size [e.g., the pointer-spot region of illumination 112], so that the pointer-spot may be detected at any location within the pointer-spot detection region 921. The detectors 951 (and their associated circuitry and interconnections not shown in the figure) may be made small so that they may take up a very small percentage of the display-region and may not degrade the quality of the displayed-image the user experiences. The detectors 951 themselves may be made as small as a quarter of a wavelength of the pointer-spot light being detected, although they may be made larger to ease manufacturability. Many alternative detector patterns may be used and the pattern may be chosen to ease manufacturability and minimize degradation of the display's image-quality.

In one embodiment, the detectors and their associated circuitry and interconnections (e.g., wiring) may be embedded in the active-display 101 as part of the display manufacturing process.

Many display technologies [e.g., active-matrix LCD's; certain plasma-displays; surface-conduction electron-emitter displays; organic-LED displays; etc] utilize transistors [e.g., poly-silicon thin film transistors] and/or diodes to control the light-output of each individual pixel-element in the display. Additional dedicated transistors and/or diodes may be distributed across the display area to detect the presence of the pointer-spot. For example, the variation in leakage current caused by the pointer-spot's presence; may be integrated at a detector and may then be multiplexed and sensed. Where only the presence or absence of the pointer-spot may need to be detected; a lower quality of light-sensitive transistor and/or diode and readout sensing circuitry may be used. The added detectors may be interconnected using the same method of connecting the individual display-pixel-elements such as Indium Tin Oxide (ITO) and may be fabricated to be mostly transparent so as to not compromise the quality of the display.

In an alternative embodiment, the detectors and their associated circuitry and associated inter-connections may be fabricated on a separate substrate (e.g., silicon, sapphire, glass-plate, clear plastic-sheet, etc) that is then attached to the display's pointer-spot detection-region 921. There are many semiconductor processes, known to those skilled in the art, that may be utilized to create distributed detectors on a flexible (e.g., thin) sheet of substrate material. In some embodiments, an optical filter and/or an optical lens may be placed in front of each detector during the manufacturing process. In one embodiment, the substrate may be a flexible sheet or roll containing distributed detectors [and their associated circuitry]. The sheet of detectors and associated circuitry may have an adhesive backing to allow its attachment to active-displays 101 and/or fixed-displays 109 and/or real-world-objects. Such a sheet may also be used to retro-fit older active displays 101.

Retro-Fitting Older Displays with a Display-Frame:

An alternative embodiment of the invention may allow retro-fitting the invention to older displays that do not have detectors and/or cameras. A separate structure [e.g., a display-frame 941] may be manufactured and calibrated with attached/embedded detectors and/or cameras. The user may purchase the display-frame 941 assembly and then attach the structure to an older active-display 101.

In another alternative embodiment, the size of the display-frame 941 [e.g., structure] may be made adjustable, so that a single frame design may be retro-fitted to a range of displays of different sizes and/or aspect-ratios. For example, the X and/or Y dimensions of the detection-region 921 may be defined by telescoping segments that side relative to each other to allow the display frame to be expanded or contracted to accommodate a wide variety of different sized displays. Once the detection-region 921 has been adjusted to a desired display, the frames telescoping sections may then be locked into place. Locating the cameras in the corners of an adjustable frame [as shown in FIG. 1, 8, 9d, or 10] enables an adjustable-frame to be used with a wide range of detection-region sizes and aspect-ratios. For the two camera configurations shown in FIGS. 1 and 8a, the display-frame may be configured as a telescoping-bar [rather than a rectangular frame] with cameras at each end of the bar. The bar may then be attached to the upper X-axis portion of the display-frame 941 [e.g., above the display region]. During initial set-up of the display-frame, the processing 106 may obtain configuration-data that corresponds to the particular dimensions the frame has been adjusted to.

Active-Display Implementations:

An active display 101, has the capability to change what is appearing on its display. Examples of active-displays 101 include cathode ray tubes (CRT); liquid crystal displays (LCD); plasma-displays; surface-conduction electron-emitter displays (SED); digital light Processing (DLP) micro-mirror projectors/displays; front-side or back-side projection displays (e.g., projection-TV); projection of images onto a wall or screen; computer-driven projectors; digital-projectors; televisions; DVD-player-screens; light emitting diode (LED) displays; variable 3-D displays; variable holographic displays; or any other type of display where what is being displayed can be changed based on context and/or user actions. In general, active display(s) of any type may be used as all or part of a pointer-spot detection-region 921.

The images that are displayed on the active-display(s) 101 may be controlled by the processing 106. In some embodiments, the active-display(s) 101 may show one or more control-menus or images with selectable-objects and the user may then use the pointer-spot to indicate their desired selection. An active-display 101 may display images of selectable-objects, selection-options, control-selections or menu-options, that a user may select or interact-with.

In some embodiments, multiple active-displays 101 may be active simultaneously and the processing 106 may coordinate activity across or between the multiple displays. In some embodiments, a single active-display 101 may be dedicated to the remote control function and may be used to control one or even all of the user's electronic-devices. In an alternative embodiment, multiple control-active-displays are made available at many locations and the user may control all their electronic-devices from any one of the displays they happen to be near.

In other embodiments, the active-display(s) 101 may be embedded within one or more of the electronic-devices being controlled and may be temporarily utilized to perform the remote control functions. For example, a television-display [or DVD player display; or home media-center display] may be temporarily used as the remote-control-display, when needed, in-order to temporarily display images of selectable-object(s)/selection-menus that control other electronic-devices that don't have their own display [such as a stereo system; Compact-Disk (CD) player; iPod player; Video Cassette Recorder (VCR); Digital Video Disk (DVD) player; Digital Video Recorder (DVR) and cable-channel box].

In other embodiments, the control function and active-display(s) 101 are integral to the electronic-device. For example, in a personal computer, the remote-controller 105 may be perform the same functions as a mouse (or any other type of computer pointing device) by acting upon or interacting-with selectable-objects that are displayed on the computer display.

Menus, Selectable-Objects and Point-of-Action:

The user may use the pointer-spot 112 to select and interact with objects or groups-of-objects that are within the detection-region(s) 921. In some embodiments, the processing 106 has knowledge of the each objects location and the allowed types of selection/interaction with the object.

Selectable-objects may appear on active-display(s) 101 and/or fixed-display(s) 109 and/or as real-world-objects. Typically, fixed-displays 109 and fixed-objects are unable to change their appearance. In general, selectable-objects may be two-dimensional (2D) or three-dimensional (3D).

In some embodiments, the menu-images and/or selectable-objects that are shown on the active-display(s) 101 may change over time as managed by the processing 106 and may be based upon the user actions; the operating state and/or the current-context. To reduce user complexity, only those selection-options that apply in the current context may be presented to the user at any given time. For example at a given time, the user may be presented with only that subset of control buttons that applies in the current context; rather than being presented with all the control buttons that appear on prior-art remote-controllers.

In some embodiments, real-world-objects may be within the detection-region 921 and may not change with context or user control-actions. Examples of fixed real-world-objects include mechanical controls or switches that control a device (e.g, a physical on/off button on the front of a device); hard-copy text and/or symbols; printed material (e.g., control icons/images or text printed on paper/poster-boards); or any other type of fixed-object. The processing 106 may be provided with configuration data that defines the location of all the selectable fixed-objects within the detection-region 921 and defines the corresponding actions to take when selected or interacted with.

In some embodiments, only a subset of the objects, in an active-display 101 or passive-display 109, may be selectable, since some objects in the display(s) may only be present for ornamentation or artistic purposes (and are not intended to be selectable). As an example, a DVD menu-image on an active-display 101 may contain a number of selectable objects along with non-selectable objects and possibly underlying non-selectable background stills/image(s) from a movie.

- Examples of what the selectable-objects can represent are:
- "Setup or configuration" options such as "input source"; "language choices"; "audio-mode"; volume; channel; etc
- Content choices the user may view such as movies; movie scenes; DVD special features; etc.
- Menu control options such as "Show more options"; "exit (from current command mode)"; "exit and close menu"; "back"; "forward";
- "undo"; redo" configuration actions.
- Web browser objects.
- Any other type of configuration or control or choice or selection.

Figure 4A:
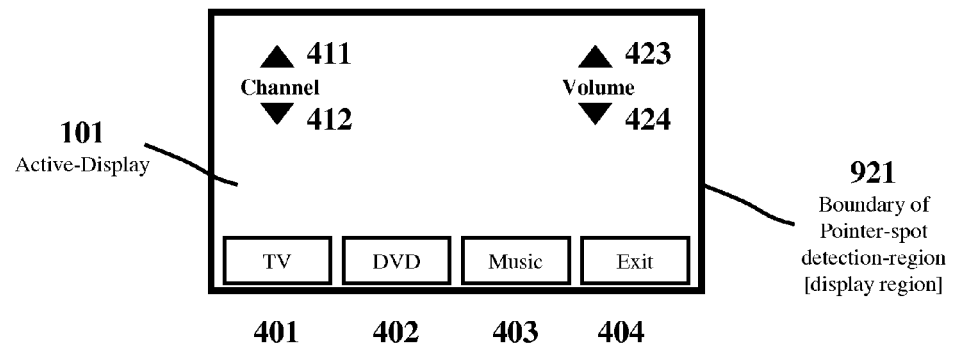
FIG. 4a illustrates an example of selectable-objects on an active-display that the user may select using the remote-controller's pointer.

FIG. 4*a* shows an example of selectable-objects that may be shown on an active-display 101. The selectable-objects may be any type of displayed-object such as text; icons; or images. For example, the user may be presented with a set of control-objects that the user may select from. For example in FIG. 4*a*, the user may select one of the control-objects shown on the active-display 101: "TV" 401; "DVD" 402; "Music" 403; "Exit" 404. For example, when the user places the pointer spot is on/near the "DVD" selectable-object and activates a "select", a menu of options for controlling the DVD-player may be then be displayed on the active-display 101.

As also shown in FIG. 4*a*, the active-display 101 may also contain selectable-objects that control and/or configure a device. For example, when the pointer spot is on the up-arrow 411 or down-arrow 412 and the "select" is activated, then the device's current channel may be change. Similarly, when the pointer-spot is on the up-arrow 423 or down-arrow 424 and the "select" is activated and then the device's volume may be changed. In some embodiments, the menu-selections may only temporarily utilize a small portion of the active-display or may be transparent so the underlying images are still visible. In alternative embodiments, a dedicated portion of an active-display 101 may display the currently needed menus-selections.

Figure 4B:
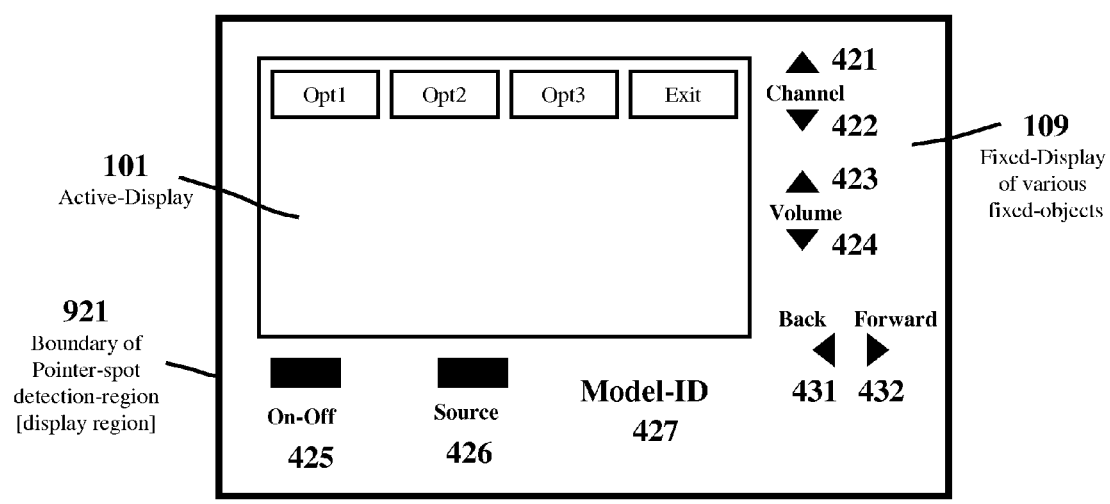
FIG. 4b illustrates examples of various fixed-objects (e.g., physical controls or fixed-images) that the user may select using a pointer-spot created by a light-beam from a light-emitting pointer.

FIG. 4*b* shows an example where both an active-display 101 and a fixed-display 109 containing selectable fixed-objects (421; 422; 423; 424; 425; 426; 427; 431; 432) are located within the pointer-spot detection-region 921. The fixed-objects may be any type of real-world-object including the actual physical controls of a device. For example, the channel-up-button 421 and channel-down-button 422 (e.g., physical hardware buttons) located next to the active-display 101 may be selectable-objects. For example, if the user places the pointer-spot 112 on the channel-up-button 421 and activates a "select"; then the detectors may capture the location of the pointer-spot 112 on the fixed-object; and the processing 106 may then complete the user's request, which is to move one channel-up. Note that the actual hardware-button is not pressed but command-codes equivalent to the hardware-button function may communicated 115 to the specific device being controlled 108. In an alternative example of FIG. 4*b*, all the objects in the fixed-display 109 may appear [e.g., were printed] on a structure [e.g., a plastic surface] that is located within the detection-region 921. For example, frequently used controls (e.g., volume) may be printed as fixed-display-objects around an active-display 101 but within the detection-region 921.

Figure 4C:
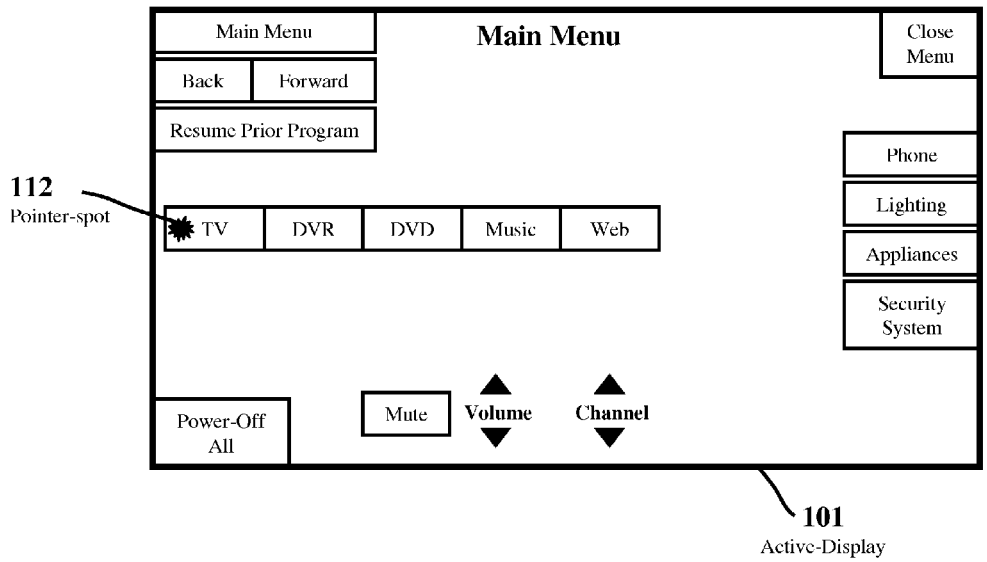
FIGS. 4c to 4e illustrate examples of selectable-objects on an active-display that a user may select using a pointer-spot created by a light-beam from a light-emitting pointer.

For the example in FIG. 4*c*, the user may select one of the control-objects shown on the active-display 101 such as "TV"; "DVR"; "DVD"; "Music"; or "Web". For example, if the user places the pointer-spot 112 on/near the "TV" selectable-object and the user presses the control-actuator 104 to cause a "select", then a "TV menu" (e.g., FIG. 4*d*) with options for controlling television(s) may be then be displayed on the active-display 101. Or alternatively, if the user places the pointer-spot 112 on/near the "DVD" selectable-object and activates a "select", a menu (e.g., FIG. 4*e*) of options for controlling the DVD-player may be then be displayed on the active-display 101.

As shown in FIG. 4*c*, the active-display 101 may also contain selectable-objects that control and/or configure a device. For example, when the pointer-spot 112 is on the channel-up-arrow or channel-down-arrow and the user presses the control-actuator 104 to cause a "select", then the device's current channel may be change. Similarly, when the pointer-spot 112 is on the volume-up-arrow or volume-down-arrow and the user presses the control-actuator 104 to cause a "select" and then the device's volume may be changed. In some embodiments, the menu-selections may only temporarily utilize a small portion of the active-display or may be transparent so the underlying images are still visible. In alternative embodiments, a dedicated portion of an active-display 101 may display the currently needed menus-selections.

Figure 4D:
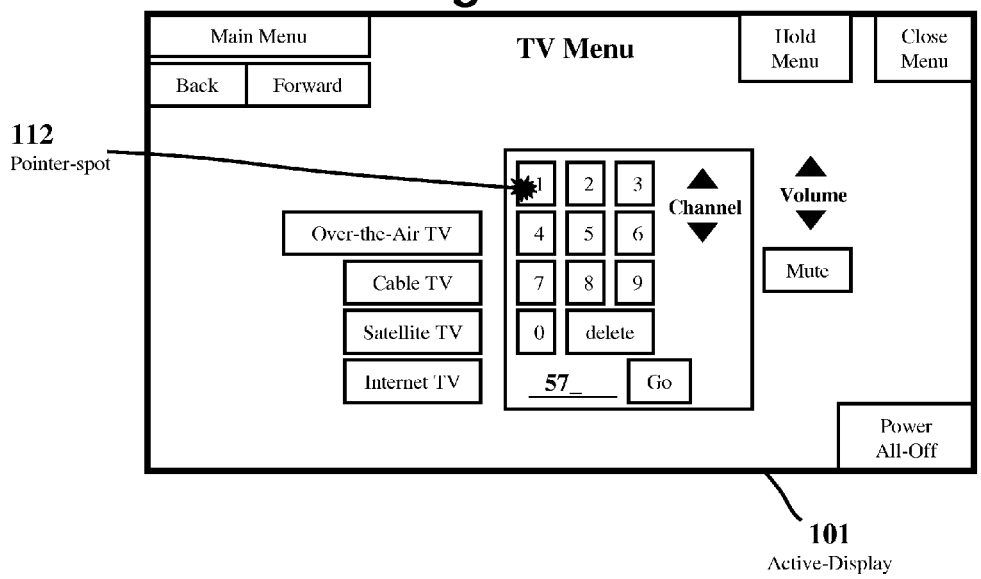
Figure 4E:
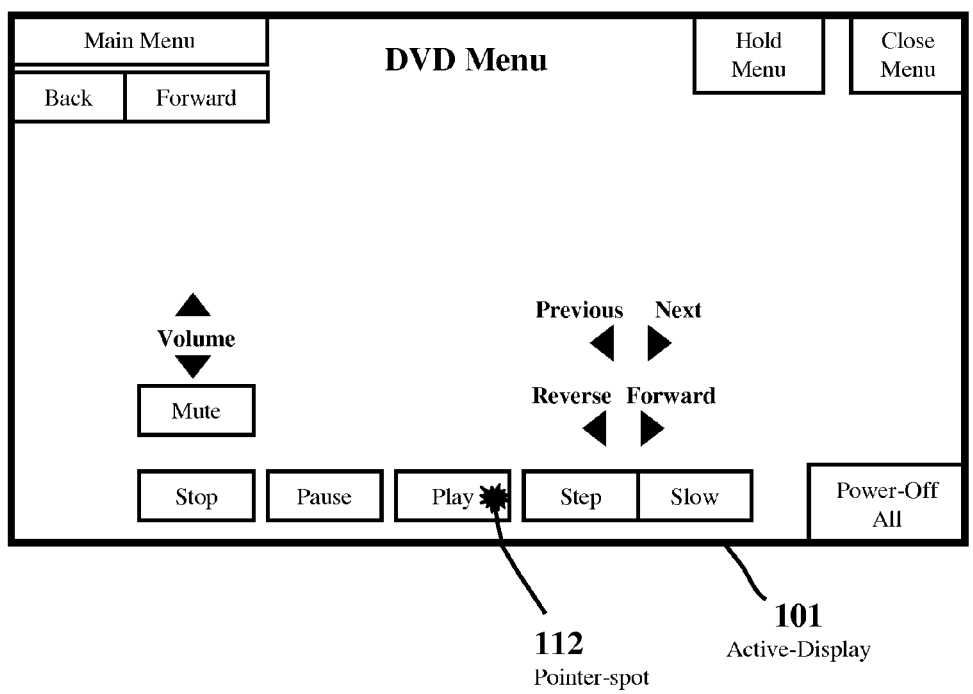

In some embodiments, a virtual-keyboard containing a display of alpha-numeric characters and/or symbols, may be temporarily presented on the active-display 101; so the user may select a sequence of the symbols as a control "input". FIG. 4*d* illustrates one example of a numerical entry of a channel number by a user. As shown in FIG. 4*d*, a "TV menu" shown on an active-display 101 may include a virtual-keyboard (with the numbers 0 thru 9, as well as other virtual-keys). The user may then use the pointer-spot 112 and user presses of the control-actuator 104; to select a sequence of numbers to go to a specific channel (e.g., select "5" then "7"). Then the user places the pointer-spot on the "go" object; and the user presses the control-actuator 104, to cause the TV to display the programming on channel 57. The numbers may be shown in their selected sequence on a portion of an active-display 101, so the user may verify what is happening (e.g. "57_" may be displayed after the first two selections have been made).

Figure 5:
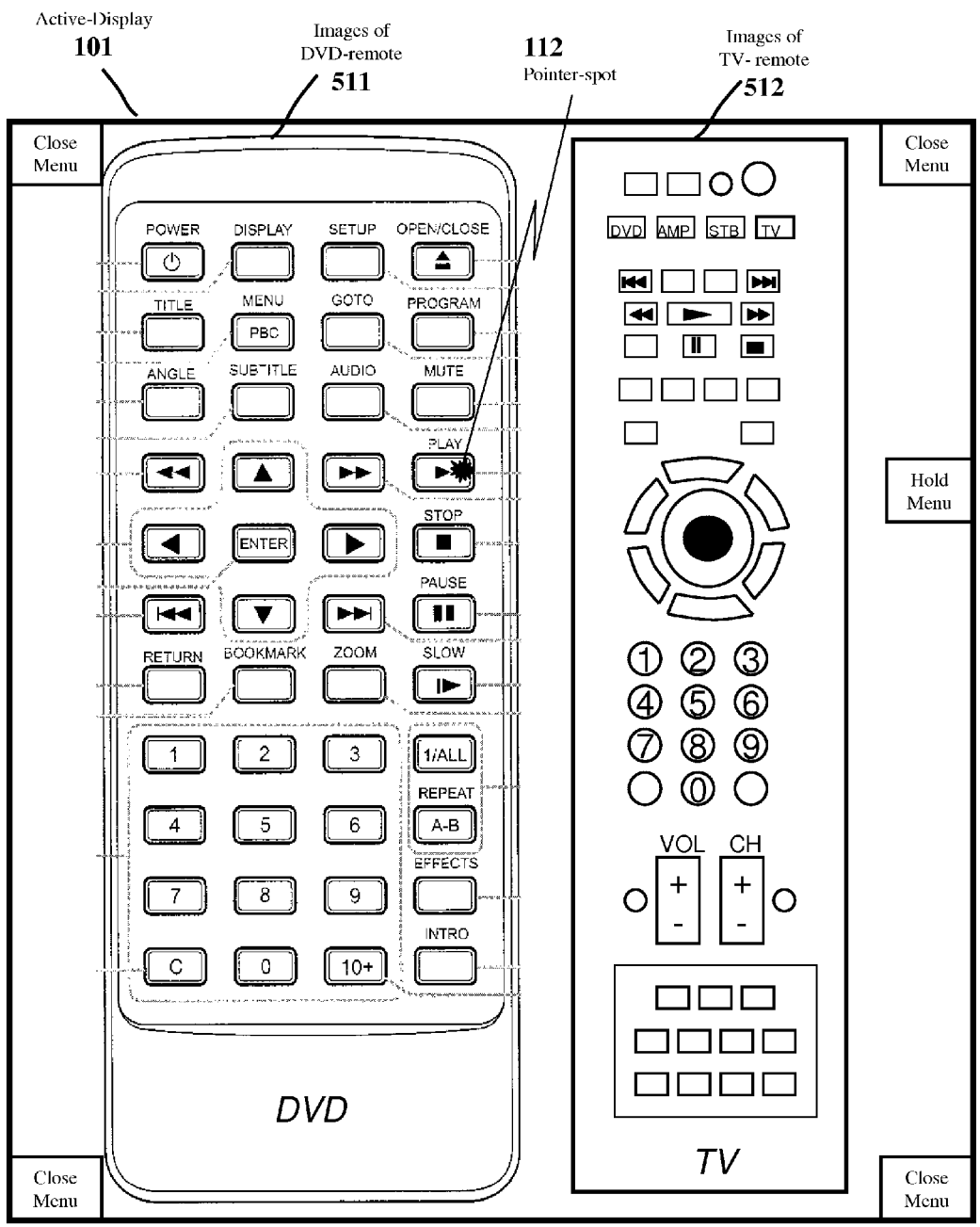
FIG. 5 illustrates an image of the individual control buttons of a prior-art remote being displayed on an active-display and the selection of an individual control button ("play") with a pointer-spot.

FIG. 5 shows one example of a menu-image that may be displayed on an active-display 101. In this example, an image 511 of a physical DVD-remote 11 and an image 512 of a physical TV-remote 12 may be shown on an active-display 101. As shown in FIG. 5, other selectable-objects, such as "Close Menu" and "Hold Menu, may also be shown on the active-display 101. As an optional enhancement, only those buttons that are effective are highlighted on the active-display 101, to indicate to the user (in the current context) which buttons are currently selectable-objects that may be selected. To control an electronic device, a user orients the remote-controller 105 to position the pointer-spot 112 "on" or "near" the desired control button of image (511 or 512) and then the user presses the control-actuator 104 on the remote-controller 105 to "select" that selectable-object (e.g., a control-button on 511 or 512). FIG. 5 shows an example of the pointer-spot 112 being positioned, by the user, on the "play" button of the image 511 of a DVD-remote.

In embodiments that perform the equivalent-functions of a computer-mouse or pointing-device, the user may use the pointer-spot to define points-of-action or areas-of-action that may appear in active-display(s) 101. For example, in an interactive drawing program on a personal computer, all or substantially-all of the objects may be selectable or interactive. For example, the user may interact with selectable objects in-order to select, cut and paste objects; or modify objects such as stretching or changing the object dimensions. The currently active cursor location or point-of-action or area-of-action may be highlighted on the active-display 101.

In situations or embodiments where the processing is unable to obtain knowledge of the locations [and/or the control-meaning] of the objects in a control-image, virtual navigation buttons/icons [up; down; left; right] may be presented to the user on an active-display 101. In some cases, the virtual navigation buttons may be (partially) transparent so that the underlying image(s) is still visible to the user. For example, if the location information is unavailable for the special features navigation of a DVD, the equivalent navigation-buttons available on a prior-art remote-controller may be presented virtually to the user to allow navigation of the DVD's content.

The following considerations related to active-displays, fixed-displays and selectable-objects may be helpful in certain embodiments:

Displays and objects may be designed to make the pointer-spot easier to detect.

The difference between selectable and non-selectable objects in display-images should be immediately apparent to the user; in-order to minimize wasting the user's time by trying to select a non-selectable object on the display.

Menu-items may be designed to minimize the amount of the underlying entertainment or program that is masked. Menu-selections may be partially transparent so the underlying entertainment or program is still visible.

Menu-selections may be placed on part or all of the active-display(s) 101.

Menu-items and control-screens may be automatically removed from an active-display 101 when there is no user activity for a certain time (e.g., 5 seconds).

The pointer-spot may blink on and off so the user can still see display details that might be masked by the pointer-spot 112.

A user selectable-object (e.g., "help" icon) may be selected by the user to see additional information. A pop-up box with additional information may be optionally provided. Or a "help" option accessible via a "right-mouse-button" equivalent.

"Undo" and "Redo" buttons may be included to enable a user to easily recover from accidental configuration mistakes/errors.

FIG. 18 illustrates one embodiment of a state control diagram for control of an active-display and selection of selectable-objects from display-menus.

Processing Implementations:

The processing 106 may include circuitry to allow communication 114 with the remote controller 105 and allow communication 115 with the active-display(s) 101 and the device(s) being controlled 108. For example, captured-images may be transferred to the processing 106 in-order to determine the location(s) the user had selected and which object(s) the user is selecting or interacting-with.

The processing 106 may be in a single location or distributed across multiple physical locations (e.g., enclosures or devices) that are connected via a communication paths (114 or 115) such as a network. For example, the processing may be located with or within or distributed across: the remote-controller 105 or active-display(s) 101 or the electronic-device(s) being controlled or may be in a separate enclosure(s). In some embodiments, the processing 106 may be shared with the devices-being-controlled 108.

The processing 106 may be implemented by any combination of: a computer or general-purpose-processor(s) capable of executing software programs (e.g., microprocessors); Digital Signal Processor(s) (DSP); a dedicated hardware processing device; integrated-circuit(s) [IC's]; Application Specific Integrated Circuits[(ASIC's] or Field Programmable Gate Arrays [FPGA's]; or any other type of other electric/electronic circuitry.

The processing may be embodied as a program for execution by a processor such as a computer or DSP, and as a storage medium storing such a program. Further, the processing may be implemented as a method, apparatus, program or storage medium for separate application to a server [or client] on a communication network.

Processing may be implemented with any analog and/or digital processing hardware such as Digital processors, Central Processing Units (CPU), Digital Signal Processors (DSP), state machines, controllers, micro-controllers, Integrated Circuits (IC's), Custom Integrated Circuits, Application Specific Integrated Circuits (ASIC's), Programmable Logic Devices (PLD's), Complex Programmable Logic Devices (CPLD's), Field Programmable Gate Arrays (FPGA's), Electronic Re-Programmable Gate-Arrays/Circuitry and any other type of digital logic circuitry/memory.

If the processor is comprised of programmable-circuitry [e.g., electronically re-configurable gate-array/circuitry], the processing program (or portions of the processing program) may be incorporated into the downloadable digital logic configuration of the gate array(s).

Processing and/or processors may include a digital processing and storage memory. The digital processor may incorporate and execute the processing program to process the composition data. Memory may hold composition data; software (program) code; and working storage.

In some embodiments, the digital processor may comprise a plurality of processors in a multi-processing arrangement which may execute the sequences of instructions contained in memory. Memory may be implemented using random access memory (e.g., DRAM, SRAM), registers, register files, flip-flops, integrated circuit storage elements, and storage media such as disc, or even some combination of these. Memory may include a non-volatile memory to store boot-up data and other data locally. Memory may optionally include a hard drive or other mass storage device. Software code; processing programs; firmware; hardware configuration data; composition data and other data may be stored in the memory.

Processing Functions and Approaches:

Depending on the specific embodiment, the processing 106 may perform one or more functions including:

Maintain knowledge of the devices 108 that are connected to a user's system.

Control and maintain knowledge of what is currently being displayed on each of one or more active-displays 101 including knowledge of all the selectable-objects.

Maintain a database of selection-menus and control-menus for each device.

Have knowledge of all the fixed-display(s) 109 and real-world objects that are within all the pointer-spot detection-region(s) 921 in the user's system. Maintain knowledge of the location(s) of fixed-objects (and their corresponding control functions) previously defined to be associated with a particular electronic-device.

Control [and adjust] the operation of the pointer 102 and/or detectors/imager(s).

Access or receive database; menu; and/or control information from media inserted in user-devices being controlled (e.g., DVD menu information).

Determine the location(s) and object(s) the pointer-spot designated.

Determine which of several devices or displays, the captured-image(s) and user-control actions correspond to.

Change the state or mode of the appropriate device based on user selections and/or control-actions.

Change what is shown on the active-display 101 based on user "selections", control-actions and/or the current context.

Maintain a pre-programmed sequence of display images and/or selectable-objects that are dependent on the ordering of user selections.

In some embodiments, determining which one of a plurality of detection-regions 921 is currently being used.

Other functions that are disclosed in this specification.

Figure 12:
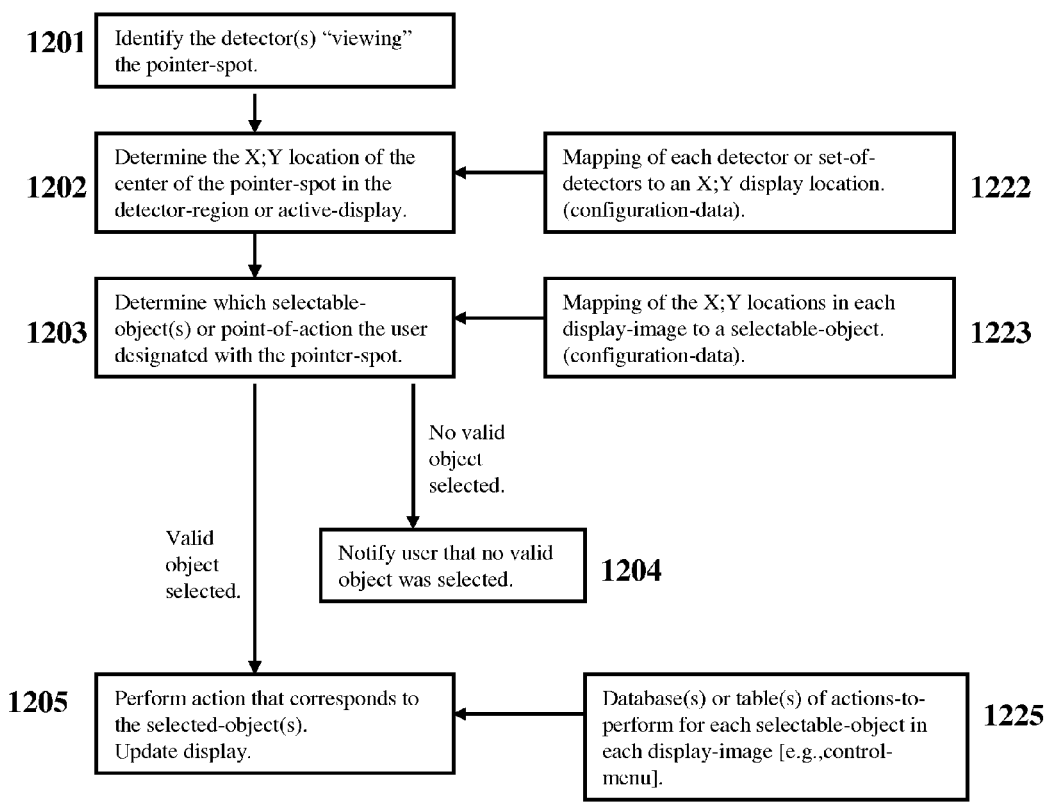
FIG. 12 shows one embodiment of a processing flow chart for determining and performing a user's intended action.

FIG. 12 shows one embodiment of a processing flow chart for determining and performing a user's intended action. In block 1201, the processing 106 may "identify the detector(s) viewing" the pointer-spot". For example, the relative magnitude of the detectors may be examined to determine the specific detectors that are detecting the pointer-spot 112. In some embodiments (e.g., where the pointer spot has a known intensity profile and the pointer-spot extends over multiple pixels), centroid-processing may be used to determine the "pointer-spot" location with greater precision (e.g., to an error that is smaller than the size of the pointer-spot). In many embodiments, this extra precision may be unnecessary.

For embodiments using cameras mounted near the display edge (e.g., FIG. 8*a*), each detector may see an angle-of-view. The length-dimension of an angle-of-view [e.g., the pixel length] may increase linearly with the distance away from the camera as shown in FIG. 8. The resolution-size of a camera pixel near the camera may be several times smaller compared with one the far side of the detection-region. For this reason, a pointer-spot near a camera may appear in many more detectors; than a pointer-spot that is located away from the camera. When multiple detectors are illuminated by the pointer-spot, the accuracy of its location may be improved by assuming the pointer-spot is near the center of the illuminated detectors or by using centroid-processing techniques [e.g., using the relative detector illuminations along with the known illumination shape of the pointer-spot].

In block 1202, the processing 106 may "determine the X:Y location of the center of the pointer-spot in the detection-region 921 or active-display 101". A "mapping of each detector or set-of-detectors to an X:Y display location" 1222 may be provided as configuration-data. FIG. 7*b* shows a simplified example of such a mapping.

In block 1203, the processing 106 may "determine which selectable-object(s) or point-of-action the user designated with the pointer-spot". The processing 106 may utilize a "mapping of the X:Y locations in each display-image to a selectable-object" 1223. FIG. 7*b* shows a simplified example of such a mapping. The display-images may include control-menus; selection-options; and/or an interactive-images [e.g., for an interactive drawing or word-processing application]. For some display-images, some X:Y locations may not be associated with any selectable-objects [e.g., are white-space or a non-selectable region]. For embodiments that are similar/equivalent to a computer-mouse, this process may also include establishing a new cursor location or determining the point/area in a computer display that is "selected".

Each "selection" menu may have known locations for its selectable objects. A mapping or lookup table can be pre-created for each menu-image which translates each display location to one of the selectable-objects or a non-selectable region.

In some embodiments, multiple menu-images may share the same mapping table when all their selectable-objects are at the same locations. Table sizes may also be reduced in some embodiments by sequencing through multiple levels of mapping tables.

If the processing determines that "no valid object was selected" in block 1203, then the user may be notified of the selection error in block 1204.

Per in block 1205, if the processing determines that "a valid object was selected" in block 1203, then the processing 106 may perform the action that corresponds to the selected-object(s) and update the active-display(s) with new display-image(s). The processing may utilize "database(s) or table(s) of actions-to-perform for each selectable-object that appears in each display-image" 1225. FIG. 7*a* shows a simplified example of such a table.

Once the processing 106 has determined the selected-object or point-of-action, then action(s) may be taken that correspond to that the user's selection. Configuration-data 630 may be provided to the processing 106 to facilitate this. This configuration-data may include a database or tables that define what actions to take for each selected-object in each control-image/menu.

In some embodiments, the selected-object [or the selected-point-of-action] may be the highlighted on an active-display 101 in a way that also allows the user to simultaneously visually "see" that their intended selection has occurred. For example, the selected-object may be "highlighted" using a unique color; brightness; shading; framing; underlining; or modulation/blinking pattern.

Some examples of the types of actions that may be taken include:

Control-actions on one or more electronic-devices being controlled (e.g., "change the channel" or "change the source"). Control-actions may be communicated to the specific electronic-device(s) 108 being controlled over a communication path 115.

Displaying new image(s) or modifying the prior image(s) that appear on one or more active-displays 101. New display-images may include control-menus; selection-options; and/or an interactive-images [e.g., for an interactive drawing or word-processing application].

Highlighting or modifying the selected-object(s). This may include taking actions that modify the selected-object.

Displaying pop-up menus; information overlays; or additional details associated with the selected-object.

Any type of action equivalent to a computer mouse or other computer-pointing-device used to control or interact with a computer or other electronic device.

The actions to be taken may be defined in advance (e.g., configuration-data) using table(s); database(s); flowcharts; conditional event sequences; state diagrams; conditional programming; or any other method.

FIG. 7*b* shows part of a simplified table that may be used to map a pointer-spot location to a particular selectable-objects present in the display-region. For each control-menu (e.g., control-menu 5), a selection-region may be is defined for each selectable-object that is in that menu-image. In this example, the second column of FIG. 7b defines the X:Y coordinates of the four corners of the rectangular selection-region that define the selection region for each selectable-object in the display-region. More generally, the selection-region for each object may be defined to have any desired shape.

FIG. 7a shows a part of a simplified table that may be used to map from each selectable-object to the specific control-action(s) that are associated with each selectable-object in each control-menu image. This example may be typical of the remote controlling a television or a DVD-player or similar electronic-device. For example, per the second row of FIG. 7a, if "control-menu 5" is being displayed and the user "selected" the "up-volume" selectable-object, then "the volume is increased by 1 increment" and "control-menu 5" is presented to the user again so the user may make additional "control-type" selects that are available on that image-image. Entries may be provided for all menu-images that contain selectable-objects and for all selectable-objects that are in each menu-image.

Figure 17:
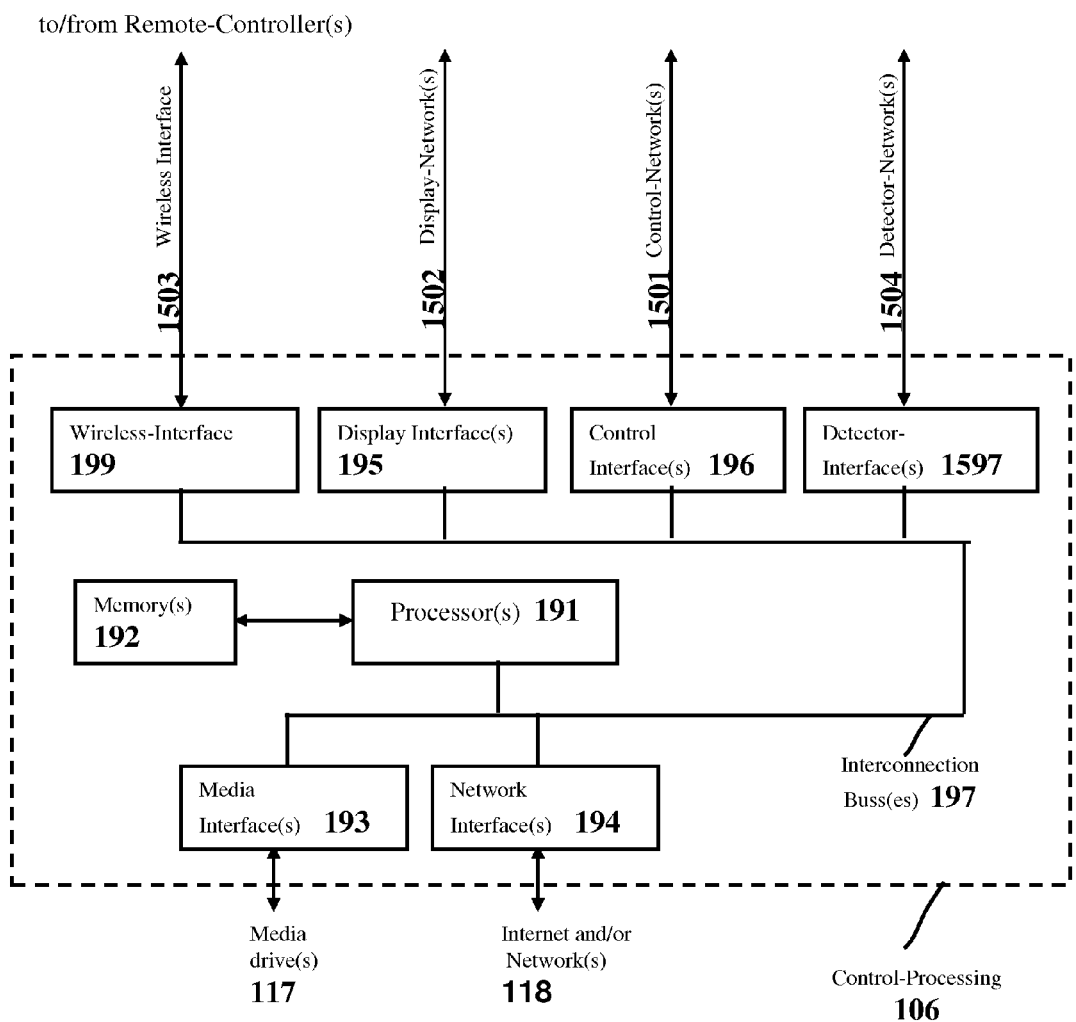
FIG. 17 illustrates one embodiment of a block diagram of the control-processing.

Control-Processing:

FIG. 17 shows an example of one embodiment of the control-processing 106. The control-processing 106 may include digital processor(s) 191, memory(s) 192, media interface(s) 193, network interface(s) 194, display interface(s) 195, control interface(s) 196, detector-interface(s) 1597, interconnection buss(es) 197 and wireless-interface 199. In some embodiments, the data from the detectors, imager(s), and/or camera(s) [e.g., 131-139, 971, 972, 991] may be sent across the display-network(s) 1502 to the control-processing 106. In other embodiments, the data (or processed data) from the detectors 951, imager(s), and/or camera(s) [e.g., 131-139, 971, 972, 991] may be sent across detector-network(s) 1504 to detector-interface(s) 1597 in the control-processing 106.

In some embodiments, the wireless-interface 199 may be packaged together with the control-processing 106. In other embodiments, the wireless-interface 199 may be packaged separately from the rest of the control-processing 106, so that wireless-interface 199 may be positioned to provide a more line of site view of the wireless-interface 161 that is located in remote-controller 105. This may allow more flexibility in the placement, relative to the user and the remote-controller 105.

In some embodiments, the control-processing 106 may be packaged within or near the active-display 101, in-order to provide the wireless-interface 199 with a more line of site view of the wireless-interface 161 that is located in remote-controller 105.

In some embodiments, the wireless-interface 199 may be packaged as part of or near the active-display 101, in-order to provide the wireless-interface 199 with a more line of site view of the wireless-interface 161 that is located in remote-controller 105; while the rest of the control-processing 106 is located elsewhere.

In one embodiment, the control-processing 106 may be embedded in one of the electronic-devices being controlled 108. For example, the control-processing 106 may be embedded in the same package as one of the active-displays 101. In this case, the display-bus may be embedded within the active-display 101. A portion of the control-network 1501 may be embedded with active-display 101, to control the active-display settings. In addition, the control-network 1501 may extend external to the active-display 101 packaging to allow control of one or more additional electronic-devices 108b-108k that may be external to the active-display 101 packaging.

The control-processing 106 may generate display menus that are sent to an active-display 101 over display-network(s) 1502. The display-network(s) 1502 may be any type of wired or wireless communication path which has sufficient pixel resolution for the images being displayed. Examples include High Definition Multimedia Interface (HDMI); Digital Visual Interface (DVI); the VESA Display Port; Unified Display Interface (UDI); Display Data Channel (DDC); Wireless Digital Video; S-Video; EVGA; XVGA and VGA. The active-display 106 may also optionally receive set-up or configuration commands/controls from the control-processing 106 via a control-network(s) 1501.

Design and Calibration-Data:

The mapping from each detector to a corresponding X:Y location within the detection-region 921 may be determined from the design-models and/or experimentally with calibration procedures performed during design/manufacture. For example, a calibration-grid of known X:Y locations may be defined throughout a detection-region 921. When calibrating active displays, each grid-point may be illuminated on an active-display 101 to define where a pointer-spot 112 will be placed. Once the pointer-spot has been placed at a known grid X:Y location, the detector or detector(s) that are activated by the pointer-spot may be recorded. The number of points in the calibration-grid may depend of the accuracy requirements needed for each particular embodiment. The design or calibration data may be provided to the processing 106 as configuration-data, during manufacture or initial set-up.

To speed up the calibration process, multiple X:Y locations that are appropriately spaced, may be simultaneously illuminated with multiple pointer-spots. A sequence of such multiple simultaneous locations may be used until a complete grid of X:Y locations has been experimentally tested.

Configuration-Data:

In some embodiments, configuration-data may be provided to the processing 106 to allow the remote-controller 105 to be interoperable with any number of user-devices. Some examples of configuration-data include:

The model-number or other ID of each device being controlled.

A set of control-menus [for each device] that may be displayed on an active-display(s) 101.

Definitions of the selectable-objects in each control-menu.

Definitions of the control actions that may be performed on a user-device when each selectable-object is "selected".

Definitions of the next control-menu or other image-content to display on the active-display when each selectable-object is selected.

Definitions of the control actions that are to be perform on a user-device when each fixed-object is "selected".

For entertainment media (e.g., DVD movie), definitions of the menu-selections for each menu-image included on the DVD.

The communication path (e.g., RF channel) and the specific control encoding necessary to control each of the user's electronic-devices.

The infrared patterns/codes needed to control each of the user's older infrared controllable electronic-devices.

In some embodiments, the configuration data that is needed for a user-device, may be provided to the processing 106 during the initial set-up of that user-device. For example, when a user adds a tenth device 108 to their home-system, the configuration-data for that electronic-device may be input into the processing 106 as part of the initial set-up so that the same remote-controller may be used to control all 10 devices. The configuration-data may be saved into a non-volatile memory so set-up is required only once per device.

There are many ways that the configuration-data may be provided to the processing 106; including:

The configuration-data is provided by the device(s)-being-controlled 108 over a communication-path 115.

The device-being-controlled 108 may have a media-drive (e.g., a DVD or CD) that may accept media containing configuration-data.

The configuration-data is provided from the Internet and/or other outside sources of information via a communication or Internet/Network 118 path.

The configuration-data is provided via a media drive 117 (e.g., a DVD or CD) or interface that is attached to the processing.

In one embodiment, when the user adds a new device, the processing 106 may access the Internet 118 to obtain the configuration-data needed to remotely-control or interact-with the new device.

Configuration-data may also be used to allow the remote-controller to act as a universal remote-control and/or to provide backward-compatibility with older infrared-controlled electronic-devices.

Communication Paths and Plug-and-Play:

The electronic-devices-being-controlled 108 may include circuitry to allow communication 114 with the remote controller 105 and/or allow communication 115 with the processing 106 and the active-display(s) 101.

The communication paths 114 and 115 may be implemented using any combination of communication technologies including both wired and wireless. Typical examples include coaxial cables; twisted pair cables; Ethernet networks; communication busses; Electro-optical (EO); fiber-optics cables; electro-magnetic (EM); infrared (IR); Radio-Frequency (RF); WiFi; Bluetooth; cell phone networks; and the Internet. Any combination of network(s) and point-to-point communication approaches may be used.

In one particular embodiment, the communication path 114 between the remote-controller 105 and the processing 106; is implemented using a non-line-of-sight wireless channel(s) (e.g., wireless radio-frequencies); so that the remote-controller does not have to be within line-of-sight with the processing 106. Similarly, non-line-of-sight wireless channel(s) (e.g., wireless radio-frequencies) may be used for communication path 115.

In one particular configuration, the remote-controller 105 may communicate to an interface [e.g., receiver/transmitter] located at the display region 921 which then communicates to the processing 106. This may assure a more line-of-sight communication path 114 to/from the remote-controller 106.

In another alternative embodiment, portions of the communication paths [114 and/or 115] may utilize the Internet or other Wide-Area-Network [e.g., cell-phone network] to allow devices to be remotely controlled from other locations [e.g., home devices controlled from work or another location].

In some embodiments, a non-direct line-of-sight wireless communication network (similar to Bluetooth or WiFi) with plug-and-play capability may be used for communication paths 114 and/or 115. This may allow the electronic-devices being controlled 108 to be located anywhere (including out-of-sight) and may reduce the cabling between the electronic-devices. In addition, the electronic-devices may be easily added and removed from the communication network(s) using wireless plug-and-play techniques.

In some embodiments, portions of the communication paths [114 and/or 115] my have a plug-and-play or automatic device-discovery capability. When the user adds or removes remote-controllers and/or devices-being-controlled to their system, the change is automatically detected by the communication path [114 and/or 115] and the processor is notified so appropriate action can be automatically performed with minimal/no user action. There are many communication and network standards [e.g., Ethernet; WiFi; Bluetooth; Universal Serial Bus (USB); Wireless-USB; Power-line-networks] that support automatic discovery and/or plug-and-play capabilities.

Figure 11:
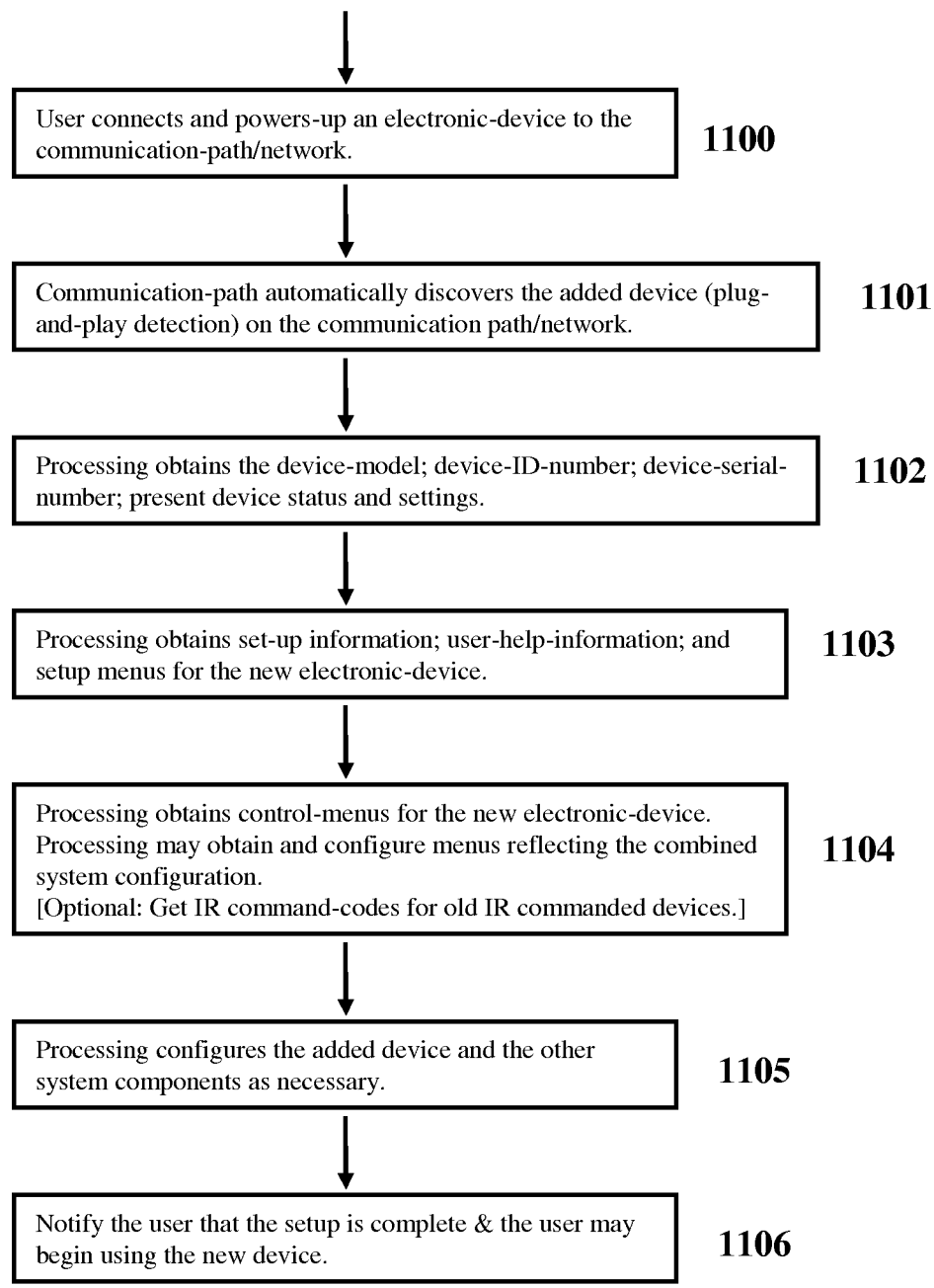
FIG. 11 shows one embodiment of a flow diagram for the automatic discovery and set-up [plug-and-play]; when the user adds a new electronic-device to the system.

FIG. 11 shows a flow diagram for one embodiment of the automatic discovery and set-up [plug-and-play] of a new electronic-device that the user has added to their system. Depending on the embodiment, any given functional block may be: optional or performed in a different order; and/or multiple blocks may be combined into one block.

In block 1100, the user powers-up the electronic-device and connects the electronic-device to the communication path 115 [such as a WiFi or Ethernet network]. In some embodiments [e.g., wireless WiFi], the connections may be pre-configured to automatically occur without requiring any user action.

In block 1101, the communication path 115 automatically discovers the added electronic-device that is now on the communication path 115.

In block 1102, the processing 106 may obtain information about the added device. The information obtained by the processing 106 may include data such as the device-model; device-ID; device-serial-number; present device-status and settings.

In block 1103, the processing may then obtain information such as set-up information; user-help-information; and set-up menus for the electronic-device being added into the user's system. Some of this information may be obtained from the electronic-device itself over the communications path 115. In some embodiments, the processing 106 may obtain this information or updated information over the Internet [or external network] communication path 118. In some cases, information may be obtained from media-drive(s) 117 attached to the processing or from media-drive(s) attached to the electronic-device being added.

In block 1104, the processing 106 may then obtain and configure control-menus; operational-menus and user-help-menus for the added electronic-device. For cases involving older infrared-code controlled electronic-devices, the processing may acquire the infrared signaling-codes used for controlling the device.

In some embodiments, the processing may also obtain and configure control-menus that reflect a combination of the user systems. For example, one menu may show a selectable listing of all the devices that the user can presently control. Or all the different TV channels or programming sources [satellite; cable; airwaves; Internet] that are currently available to the system, may be organized together on a combined control-menu(s). Or all the volume controls on the different devices may be coordinated through a combined volume menu.

In block 1105, the processing 106 configures the added device and the other system devices as necessary.

In block 1106, the user may be notified that setup is complete and the user may operate and control the added device using the display menus.

In some embodiments, it may be desirable to lockout rogue remote-controllers, by limiting remote-control to only particular remote-controller(s). The processing 106 may be configured to only accept communication and commands from remote-controllers that know predefined access-codes or identifier-codes/passwords.

In some embodiments, encryption (e.g., symmetric-key and/or public-key encryption) may be used to secure communication contents across the communication paths 114 and/or 115.

Functional Example

FIG. 3 illustrates a simple example of the functional blocks that may be used to remotely control or interact-with any electronic-device that may be controlled by selecting displayed menu-options or selecting fixed-objects. Examples of such devices include televisions; DVD-players; Digital-Video-Recorders (DVR); cable-television-boxes; home-theatre-systems; appliances; or heating/cooling systems. In a simple embodiment, the user may place the pointer-spot 112 on a selectable-object in a display region [e.g., detection-region 921] and then press the single button 203 [e.g., "select"] that is on the remote-controller 105, to cause desired control-action to occur.

This example assumes a remote-controller 105 with a pointer 102 that outputs a light-beam 111. In some embodiments, configuration-data (as discussed elsewhere) may be used in one or more of the blocks shown in FIG. 3. In some embodiments, a one time setup may be performed for each user-device in-order to identify (e.g., model number) and to provide the needed configuration-data to the processing 106, prior to controlling the electronic-device.

As shown in block 300 of FIG. 3, the user holds the remote-controller and the pointer's 102 output light-beam 111 is activated. The light-beam 111 may be activated using many different embodiments such as:

the user pressing a control-button 203
the user speaking a command (e.g., "beam-on")
sensor(s) in the remote-controller 105 may automatically detect that the user is actively using the remote-controller 105.

In block 301, selectable-object(s) [e.g., selection-options or menu-items] appropriate to the current context may be presented to the user on active-display(s) 101. In addition, other fixed-display(s) 109 or fixed-objects may also be in the detection-region 921 and may also be available for selection by the user.

In block 302, the user moves the pointer-spot on or near the desired selectable-object(s) on the active-display(s) 101 or fixed-display(s) 109; and the user initiates a "select". A "select" may be initiated in various ways including:

The user presses a control-button 203 to signify "select".
The user may release a control-button to signify "select".
The user speaks a certain word or phrase (e.g., "select").
The occurrence of the user activating the "select" may be signaled to the processing 106 via communication path 114. In one particular embodiment, the communication path 114 may be accomplished with a non-line-of-sight wireless path; so the remote-controller 105 may be unconstrained by cords/wires.

In block 303, initiation of the "select" may cause the detectors and/or imager(s) to capture one or more images [capture detector sense data] of the pointer-spot.

In block 304, the image(s) [e.g., sensed detector data] is analyzed by the processing 106 to determine the location of the pointer-spot within the detection-region 921 and to determine the selectable-object(s) the pointer-spot was on or near when the "select" was made.

If the analysis in block 304 indicates that the pointer-spot was not on or acceptably close to one of the known selectable-object(s), then the user may be notified that no valid selectable-object(s) was selected with the pointer-spot (block 311). The user may be notified in various ways including:

A visual indication on the active-display 101.
An audio message (e.g., a voice message) and/or a sound (e.g., a beep).
The user may try again by going to block 300.

If the analysis succeeds in identifying specific selectable-object(s) then user may be optionally notified of the success (block 305). The user may be notified of the action taken in various ways including:

Make the selected-object(s) into a "Highlighted-object(s)" on the display.
Moving the point-of-action [e.g., cursor location] or active-location (e.g., location of activity) on the active-display 101 to the selected-location.
Providing another visual indication on the active-display 101.
Providing an audio message or sound.

In block 306, the control-action(s) that correspond to the selected-option is communicated to the device being controlled. A few examples of control-actions are:

Increasing or decreasing the volume.
Changing the channel up or down or going to a selected-channel.
The selected video or music selection may be started.
The next (forward) or previous (back) item in the playback sequence may be started.

In block 307 as appropriate to user's current context, various items may be now shown on the active-display 101. This may include:

Highlighting [perhaps temporarily] the object the user selected on the display.
A temporary visual indication of the action taken [e.g., a symbol showing that the volume was increased].
Different selectable-object(s) [menu-items and/or selection-option(s)] may be presented to the user on the active-display 101.
Removing all selectable-object(s) [menu-items and/or selection-option(s)] from the active-display 101 (e.g., when all selections have been completed).

The user may now make additional selections or take additional control actions by continuing at block 300.

In some embodiments, the selection-menu(s) [e.g., control-menus or selectable-object(s)] options may be automatically removed from the active-display 101 when the user does not take any action after a defined period of time. For example, the selection-menu(s) may be automatically removed from the active-display 101 after 5 seconds of inactivity.

Another Alternate Embodiment

In another alternative embodiment, the detectors, imager(s), and/or camera(s) [e.g., 131-139, 971, 972, 991] may also be used to detect variations of the light-beam 111 emitted by the pointer 102, in-order to determine the occurrence of actions by a user on the actuator 104. This may eliminate the need for the remote-controller 105 to directly communicate 114 to processing 106. The variations in the light-beam 111 which indicate user actions on the actuator(s) 104 may be detected by the detectors, imager(s), and/or camera(s) [e.g., 131-139, 971, 972, 991] and may then be communicated to the processing 106. In some of these embodiments, the remote-controller 105 may not need a wireless interface 161 to communicate [114, 1503] with the control-processing 106. Referring to FIG. 16: one embodiment of a minimum remote-controller 105 may include an actuator (e.g., push button switch), a light-emitting pointer 102, and a power source 165; while a wireless interface 161 and status light(s) 141 may not be needed in a minimum configuration.

In some embodiments, the pointer may modulate the intensity or vary an on-off pattern of the light-beam 111, to communicate different user actions on the actuator(s) 104.

In one embodiment, when the user activates the actuator(s) 104 to turn on the light-beam 111 and place the pointer-spot 112 within the pointer-spot detection-region 921, then the detectors, imager(s), and/or camera(s) [e.g., 131-139, 971, 972, 991] may detect this and then cause the active-display(s) 101 to be activated [e.g., turned-on if it was off] and to cause display selectable-objects on active-display(s) 101. In one embodiment, when the user activates the actuator(s) 104 to turn off the light-beam 111, then the detectors, imager(s), and/or camera(s) [e.g., 131-139, 971, 972, 991] may detect this as an indication of a "selection" of the selectable-object that the pointer-spot was on when the light-beam 111 from the pointer goes out.

In some other embodiments, the pointer 102 may be configured to different predefined modulations or variations in the light-beam to indicate each of the different actions by a user on the actuator(s) 104. For example, the pointer 102 may vary the light-beam in a defined on and off pattern (e.g., a sequence with different on and off times); to indicate that a user action on the actuator 104 was a "selection" of a selectable-object. The sampling rate of the detectors may be made high enough to detect such variations of the light-beam 111. In some embodiments, these variations in the on and off pattern may be so short as to be not noticeable to a user.

In some of these embodiments, a standard laser presentation pointer (e.g., a simple on-off red or green laser pointer sold in an office supply store) may be used as the remote-controller 105. Short-term (e.g., microsecond/millisecond) variations in the pointer-spot intensity caused by switch bounce (such as intermittent connection of the poles of a switch when a connection is closed) that appear in the detected intensity of the light-beam 111 may be filtered out in the processing 106.

Backward Compatibility with Existing Infrared Remote Controls:

In an optional enhancement, older infrared-controlled electronic-devices may also be controlled. Universal compatibility and/or backward compatible with old infrared user devices may facilitate the easier adoption of some of the disclosed embodiments.

Figure 13:
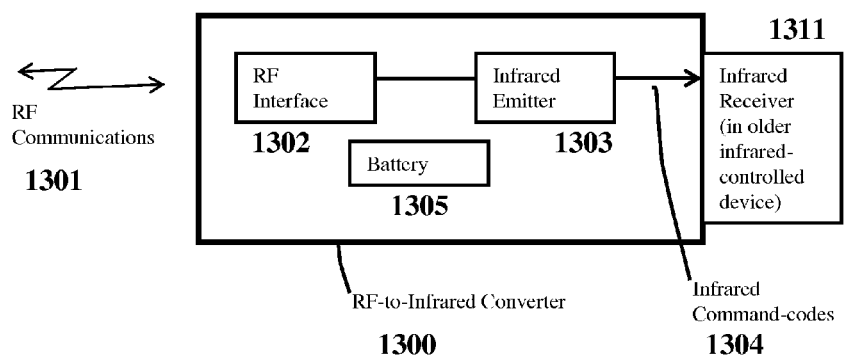
FIG. 13 shows a block diagram of an embodiment of an RF-to-Infrared Converter.

In an alternative embodiment shown in FIG. 13, an RF-to-Infrared Converter 1300 may be attached to an older infrared-controlled-device, so that infrared-command-codes 1304 from an infrared-emitter 1303 will reach the infrared-receiver 1311 in the older device. The RF-to-Infrared Converter 1300 may contain an RF-interface 1302 to receive commands [and optionally send status back] over an RF-communication path 1301 to/from the processing 106. The RF-interface may contain a radio-frequency receiver/transmitter that allows non-line-of sight communication from the processing 106 to/from the RF-to-Infrared Converter 1300. In some embodiments, the RF-communication-path 1301 may be the same-as/shared-with the communication path 115 shown in FIG. 1 or the control network(s) 1501 as shown in FIG. 15. The RF-to-Infrared Converter 1300 may also contain a battery 1305 so that no external wired-connections are need. By attaching an RF-to-Infrared-converter 1300, an older device is no longer constrained to be within infrared-line-of-sight of the remote-controller 105 or the processing 106. This may allow some older infrared-controlled devices [e.g., VCR and DVD players] to be placed out of sight of the user.

Figure 14:
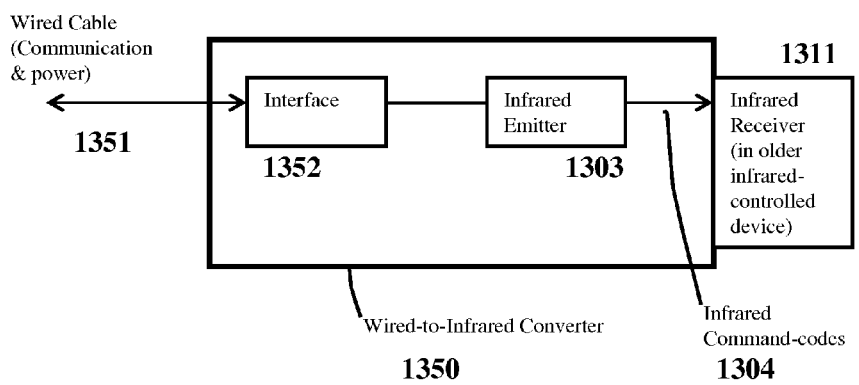
FIG. 14 shows a block diagram of an embodiment of a wired-to-Infrared Converter.

FIG. 14 shows a block diagram of an embodiment of a wired-to-Infrared Converter 1350. As shown in FIG. 14, interface 1352 may be tied to a wired cable 1351.

The processing 106 may receive configuration-data from the media-drive(s) 117 and/or Internet/Network 118 and/or Device(s)-Being-Controller 108 that includes all the necessary information for backward compatibility. The configuration-data may include the specific infrared command-sequences needed to communicate each particular control-action to the specific model of electronic-device being controlled. The configuration-data may also include a full set of selection-images or menu-images that may be used to control each infrared controlled electronic-device in the user's system.

The same or similar procedure as that described in FIG. 3 may also be used for older infrared controllable devices; except that in the block 306 of FIG. 3, the control action(s) are communicated via infrared signaling/codes to the device-being-controlled.

For example, when the user is controlling an older infrared controllable television: the processing 106 may place the appropriate selection-menus for the television on one or more of the active-displays 101 using the configuration-data. The user may then use the pointer-spot 112 of remote-controller 105 to make selections on one or more selection-menus to control the television (e.g., change channel or volume). The processing 106 then determines the desired user control-action(s). The processing may then use the configuration-data to generate the appropriate infrared command-sequence for the user's specific model television in-order to cause the desired control-action(s).

Computer-Readable Medium and Storage Media:

The processing instructions; programs; software; machine instructions; firmware; configurations of electronically configurable hardware (e.g., Field Programmable Gate Arrays); setup and configuration data; configuration and setup instructions may be stored on one or more computer-readable medium.

The term "computer-readable medium" includes any medium that participates in providing instructions to a processor for execution. Such a medium may take many forms, including, but not limited to; nonvolatile media, volatile media, and transmission media. Nonvolatile media include, for example, optical or magnetic disks or other storage devices. Volatile media include dynamic memory, such as main memory. Transmission media include coaxial cables, copper wire, and fiber optics, including the wires that comprise bus. Transmission media can also take the form of acoustic or light waves, such as those generated during radio frequency (RF) and infrared (IR) data communications. Common forms of computer-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, EEPROM; a FLASH EPROM, Flash memory; any other memory chip or cartridge, a carrier wave as described hereinafter, or any other medium from which a computer or a processor can read.

Various forms of computer-readable media may be involved in carrying one or more sequences of one or more instructions to one or more processors for execution. For example, the instructions may initially be borne on a magnetic disk of a remote computer. The remote computer can load the instructions into its dynamic memory and send the instructions.

Some Embodiments from the Parent Application:

One embodiment may be described by the following:

A method for remote control or interactive control, comprising:

providing a display region;

providing a pointer that can place a spot within said display region, wherein at least a portion of said pointer spot is visible to a user;

providing detectors that are connected or attached to said display region, wherein said detectors can sense the location of said pointer spot within said display region;

analyzing the response from said detectors and controlling or affecting at least one electronic-device;

whereby a user may control or interact-with one or more electronic devices by designating with said pointer spot within said display region.

The above embodiment may be further enhanced by the addition of any one or more of the following elements/features, either individually or in various combinations with each other:

wherein said display region contains one or more objects that may be selected or interacted with. Or wherein said display region contains one or more active-displays or fixed-displays or real world objects. Or wherein at least some of said detectors are located in one or more cameras that are connected or attached to said display region. Or wherein at least some of said detectors are located in one or more cameras that are mounted on a structure, wherein at least one dimension of said structure is adjustable to accommodate different sizes of said display region, wherein said structure is attached to said display region. Or wherein at least some of said detectors are distributed across at least a portion of said display region. Or wherein at least some of said detectors are mounted on a structure; wherein said structure is connected or attached to said display region. Or further comprising providing a user interface for conveying a user request or user action to said analyzing or controlling. Or wherein said sensing of the location of said pointer-spot by said detectors is initiated by user action or activity. Or wherein user action or user activity causes one or more objects to be displayed within said display region. Or wherein said analyzing includes determining the location of said pointer spot within said display region. Or wherein said analyzing includes determining one or more objects that said pointer spot was designating. Or wherein said controlling includes communicating commands to at least one electronic-device; wherein said commands are at least partly based upon a location of the pointer-spot within said display region. Or wherein said controlling includes altering the content or objects within said display region, at least partially based upon the object or objects that the user designated with said pointer spot. Or wherein said pointer is a light emitting source or a laser pointer or a focused light beam or a spot of light or a spot of shadow.

Another embodiment may be described by the following:

An apparatus, comprising:

a display region;

a pointer capable of designating a spot in said display region, wherein at least a portion of said pointer spot is visible to a user;

detectors that are connected or attached to said display region, wherein said detectors can sense the location of said pointer spot within said display region;

a processing-function to analyze the response from said detectors, and to control or affect at least one electronic-device;

whereby a user may control or interact-with; one or more electronic devices, by placing the pointer spot on or near objects within said display region.

The above embodiment may be further enhanced by the addition of any one of the following elements or features, either individually or in various combinations with each other:

further comprising a user interface for conveying a user request or user action to said processing. Or wherein said display region includes one or more active-displays; fixed-displays; or real world objects. Or wherein one or more objects appear in said display region when initiated by user action or activity. Or wherein said sensing by said detectors is initiated by user action or activity. Or wherein said control includes changing objects in said display region, based upon the object or objects that the user designated with said pointer spot.

One embodiment may be described by the following:

A display configuration, comprising:

a display region;

detectors connected or attached to said display region; wherein said detectors can sense the location of a pointer spot placed at locations within said display region, wherein at least a portion of said spot is visible to a user;

a processing-function to analyze the response from said detectors, and to control or affect at least one electronic-device;

whereby a user may control or interact-with; one or more electronic devices, by placing the pointer spot on or near objects within said display region.

The above embodiment may be further enhanced by the addition of any one of the following elements or features, either individually or in various combinations with each other:

wherein at least some of said detectors are located in one or more cameras that are connected to said display region. Or wherein at least some of said detectors are distributed across at least a portion of said display region. Or wherein at least some of said detectors are mounted on a structure; wherein said structure is connected or attached to said display region. Or wherein said display region contains one or more active-displays or fixed-displays or real world objects.

One embodiment may be described by the following:

Apparatus for remotely controlling one or more electronic devices, comprising:

a wearable unit having an opening sized to be worn on a hand or finger(s) of a user;

a light-emitting pointer incorporated as part of said wearable unit, wherein a pointer-spot of light is projected when said pointer is activated;

a wireless interface incorporated as part of said wearable unit;

a actuator incorporated as part of said wearable unit, so that when the user is wearing said wearable unit, the user is able to actuate the actuator with a thumb of a hand the wearable unit is being worn on;

wherein, when a first action on said actuator by the user is detected, the light-emitting pointer is activated, and a control signal is sent across the wireless interface to activate an active control-display in a display-region, and to cause selectable-objects to appear in said display-region;

wherein, when the user is wearing said wearable unit, the user is able to place the pointer-spot onto a selectable-object in said display-region while the user is able to activate the actuator with a second action;

wherein when a second action on said actuator by the user is detected, a control signal is sent across the wireless interface to cause detectors to capture an image or images of said pointer-spot in said display-region, and to cause a processor to analyze said captured image or images to determine which selectable-object, the pointer-spot is on or near; wherein when a selectable-object is determined to have been selected by the pointer-spot, the processor sends control information to affect at least one electronic device.

One embodiment may be described by the following:

Apparatus for remotely controlling one or more electronic devices, comprising:

a display-region; wherein detectors or imager(s) or camera(s), are physically attached-to or physically integrated-into said display-region; wherein each detector images a same location in said display-region, when said display-region is moved or re-oriented;

a wearable unit having an opening sized to be worn on a hand or finger(s) of a user;

a light-emitting pointer incorporated as part of said wearable unit, wherein a pointer-spot of light is projected when said pointer is activated;

a wireless interface incorporated as part of said wearable unit;

a actuator incorporated as part of said wearable unit, so that when the user is wearing said wearable unit, the user is able to actuate the actuator with a thumb of a hand the wearable unit is being worn on;

wherein, when a first action on said actuator by the user is detected, the light-emitting pointer is activated, and a control signal is sent across the wireless interface to cause selectable-objects to appear in said display-region;

wherein, when the user is wearing said wearable unit, the user is able to place the pointer-spot onto a selectable-object in said display-region while the user is able to activate the actuator with a second action;

wherein when a second action on said actuator by the user is detected, a control signal is sent across the wireless interface to cause detectors to capture an image or images of said pointer-spot in said display-region, and to cause a processor to analyze said captured image or images to determine which selectable-object, the pointer-spot is on or near; wherein when a selectable-object is determined to have been selected by the pointer-spot, the processor sends control information to affect at least one electronic device.

One embodiment may be described by the following:

Apparatus for controlling one or more electronic devices, comprising:

detectors, imager(s) or cameras(s) that detect a location of a pointer-spot from a light-emitting pointer reflecting of an object, within a pointer-spot detection-region;

processor(s) to detect a modulation or variation in intensity of the pointer-spot in said pointer-spot detection-region, that corresponds to user action on an actuator(s) at a remote-controller that corresponds to a selection of a selectable object in said pointer-spot detection-region; and to determine a selectable-object that the pointer-spot is on or near; wherein dependent on which selectable-object or selectable-objects the pointer spot is on or near, the processor sends control information across a network to affect a plurality of electronic devices.

The above three embodiments may be further enhanced by the addition of any one of the following elements or features, either individually or in various combinations with each other:

further including: said display-region; wherein detectors or imager(s) or camera(s), are physically attached-to or physically integrated-into said display-region; wherein said detectors image the same locations in said display-region, when said display-region is moved or re-oriented. Or wherein said actuator(s) is activated with a thumb of a hand the wearable unit is being worn on. Or wherein said actuator only moves in a substantially single axis when actuated by the user. Or wherein there is only a single actuator; wherein said actuator only moves in a substantially single axis when actuated by the user. Or wherein the wearable unit has only a single actuator which is a push and release button. Or wherein the wearable unit has only one push button; wherein the push button has an off position and a select position; wherein the push button automatically returns to the off position when not being pressed on by the user. Or wherein the selectable-object that the pointer-spot is on or near, is determined without displaying or moving a cursor on an active-display. Or wherein said analysis by said processor, utilizes information that defines areas or locations in said display-region that are seen by individual detectors. Or wherein said first action is to push the actuator from an off position into a first position and the said second action is to push the actuator further into a second position. Or further including a network interconnecting a plurality of electronic-devices; wherein said control information is sent to a plurality of electronic devices that are attached to the network; wherein the network automatically incorporates a newly connected electronic-device into the network, or automatically removes a newly disconnected electronic-device from the network; wherein selectable-objects for a newly connected electronic-device are automatically included in the display-region; wherein selectable-objects for a newly disconnected electronic-device are automatically removed from the display-region. Or wherein if prior to said first action, entertainment content without a selectable-object is displayed on an active-display in said display-region; and in response to detecting said first action, a plurality of selectable-objects are displayed on said active-display; and if said second action is not detected within a defined time, then the selectable-objects are automatically removed from said active-display and said content without selectable-objects is displayed on said active-display. Or wherein some of the selectable-objects in said display-region represent control buttons for a plurality of electronic entertainment devices; and said control information is sent across a network to control a plurality of the electronic entertainment devices. Or wherein the location in said display that each detector images is set during manufacture of said display; wherein said detectors image the same locations in said display, when said display is moved or re-oriented. Or wherein said detectors are limited to detecting wavelengths that correspond to said light-emitting pointer. Or wherein fixed-objects, representing controls for an electronic-device, are in said display-region. Or wherein the size of said opening is adjustable to accommodate the finger(s) or hands of a plurality of different users that have different sizes. Or wherein said first action is to push on the actuator and wherein said second action is to stop pushing on said actuator. Or wherein the actuator only moves along one physical axis in response to the user pressing or releasing the actuator. Or wherein said detectors are one or more cameras that are physically attached-to or physically integrated-into said display-region; wherein said detectors image the same locations in said display-region when said display-region is moved or re-oriented. Or wherein at least some of said detectors are mounted-on or incorporated-into a structure; wherein said structure is physically attached to said display-region; wherein said detectors image the same locations in said display-region when said display-region is moved or re-oriented. Or wherein at least some of said detectors are located in one or more cameras that are mounted on a structure, wherein at least one dimension of said structure is adjustable to accommodate different sizes of said display-region, wherein the dimension of said structure is adjusted as said structure is attached to said display-region. Or wherein responsive to the selection of a selectable-object displayed on an active-display in said display-region, some of the selectable-objects shown on the active-display are removed and other selectable-objects are displayed on the active-display. Or wherein an active-display in said display-region displays a plurality of selectable-objects that represent control buttons for a plurality of electronic devices; wherein said control information is sent across a network to control said plurality of the electronic devices. Or further comprising: a network capable of forwarding said control information from said processor to a plurality of user entertainment devices. Or further including a network interconnecting a plurality of electronic-devices, wherein said control information is sent to a plurality of electronic devices that are attached to the network. Or further including a network interconnecting a plurality of electronic-devices; wherein said control information is sent to a plurality of electronic devices that are attached to the network; wherein the network automatically incorporates a newly connected electronic-device into the network, or automatically removes a newly disconnected electronic-device from the network.

wherein said analysis by said processor, uses information that defines spatial locations of the selectable-objects, in said display-region. Or wherein if prior to said first action, an active-display in said display-region, is unpowered or is not displaying selectable-objects, then said first action causes the active-display in said display-region to power-on and to display selectable-objects. Or wherein if prior to said first action, entertainment content without selectable-objects is being displayed on an active-display in said display-region; then said first action causes the active-display to display selectable-objects. Or wherein each region in the display-region or display, that is correspondingly imaged by each detector, does not change when the display-region or display is moved or re-oriented.

wherein each region imaged by each detector, in the display-region or display, does not change when the display-region or display is moved or re-oriented.

Not Limited to Detailed Illustrations:

It should be noted that the above mentioned embodiments illustrate rather than limit the invention, and that those skilled in the art will be able to design many alternative embodiments without departing from the scope of the invention as defined in the claims.

To satisfy the requirements for enablement, this disclosure may contain one or more embodiments which illustrate a particular detailed implementation and use. For clarity simplified examples may be chosen for illustration. A detailed illustration often requires choosing only one of a plurality of equivalent detail approaches to describe. When terms such as "shall", "should", "is", "are" appear in this description, they should only be interpreted as limitations/requirements for the purpose of maintaining compatibility/consistency between the elements/parameters of the particular detailed illustration being described. Such terms should not be interpreted as limitations or requirements on the scope of the general inventive concept as disclosed in its entirety.

For example, if element "A", in a detailed embodiment, is shown as having a certain detailed configuration, then mating element "B" in that detailed example may need to have corresponding "mating" limitations; in-order to be compatible and/or interoperable with the detailed element "A". Such mating-limitations on element "B" for compatibility within a detailed illustration, do not define limitations on element "B" within all the possible embodiments that fall within the scope of the invention. If an alternate configuration of element "A" had been selected for illustration purposes, the detail implementation requirements on element "B" for compatibility and interoperable with the element "A" may be very different.

In general, the detailed implementations for the elements of the invention may have many alternate implementations that accomplish the same functional result/objective and are within the scope of the general inventive concept.

What is claimed is:

1. Apparatus for remotely controlling one or more electronic devices, comprising:

a wearable unit having an opening sized to be worn on a hand or finger(s) of a user;

a light-emitting pointer incorporated as part of said wearable unit, wherein a pointer-spot of light is projected when said pointer is activated;

a wireless interface incorporated as part of said wearable unit;

an actuator incorporated as part of said wearable unit, so that when the user is wearing said wearable unit, the user is able to actuate said actuator with a thumb of a hand the wearable unit is being worn on;

wherein, when a first action on said actuator by the user is detected, the light-emitting pointer is activated, and a control signal is sent across the wireless interface to turn-on an active control-display in a detection-region, and to cause selectable-objects to appear in said detection-region;

wherein, when the user is wearing said wearable unit, the user is able to place the pointer-spot onto a selectable-object in said detection-region while the user is able to activate the actuator with a second action;

wherein when a second action on said actuator by the user is detected, a control signal is sent across the wireless interface to cause detectors to capture an image or images of said pointer-spot in said detection-region, and to cause a processor or processors, to analyze said captured image or images to determine which selectable-object, the pointer-spot is on or near; wherein when a selectable-object is determined to have been selected by the pointer-spot, the processor sends control information to affect at least one electronic device.

2. Apparatus as in claim 1 wherein said actuator is activated with a thumb of a hand the wearable unit is being worn on, to do said first and said second actions.

3. Apparatus as in claim 1 wherein there is only a single actuator; wherein said actuator only moves in a substantially single axis when actuated by the user, to do said first and said second actions.

4. Apparatus as in claim 1 wherein the selectable-object that the pointer-spot is on or near, is determined without displaying or moving a cursor on an active-display.

5. Apparatus as in claim 1 wherein said analysis by said processor, utilizes information that defines areas or locations in said detection-region that are seen by individual detectors.

6. Apparatus as in claim 1 further including a network interconnecting a plurality of electronic-devices; wherein said control information is sent to a plurality of electronic devices that are attached to the network; wherein the network automatically incorporates a newly connected electronic-device into the network, or automatically removes a newly disconnected electronic-device from the network; wherein selectable-objects for a newly connected electronic-device are automatically included in said detection-region; wherein selectable-objects for a newly disconnected electronic-device are automatically removed from said detection-region.

7. Apparatus as in claim 1 wherein some of the selectable-objects in said detection-region represent control buttons for a plurality of electronic entertainment devices; and said control information is sent across a network to control a plurality of the electronic entertainment devices.

8. Apparatus as in claim 1 wherein said detectors are limited to detecting wavelengths that correspond to said light-emitting pointer.

9. Apparatus as in claim 1 wherein fixed-objects, representing controls for an electronic-device, are in said detection-region.

10. Apparatus for remotely controlling one or more electronic devices, comprising:
an active-display; wherein detectors or imager(s) or camera(s), are physically attached-to or physically integrated-into said active-display; wherein each detector images a same location in said active-display, when said active-display is moved or re-oriented;
a wearable unit having an opening sized to be worn on a hand or finger(s) of a user;
a light-emitting pointer incorporated as part of said wearable unit, wherein a pointer-spot of light is projected when said pointer is activated;
a wireless interface incorporated as part of said wearable unit;
an actuator incorporated as part of said wearable unit, so that when the user is wearing said wearable unit, the user is able to actuate the actuator with a thumb of a hand the wearable unit is being worn on;
wherein, when a first action on said actuator by the user is detected, said light-emitting pointer is activated, and a control signal is sent across said wireless interface to cause selectable-objects to appear in said active-display;
wherein, when the user is wearing said wearable unit, the user is able to place the pointer-spot onto a selectable-object in said active-display while the user is able to activate said actuator with a second action;
wherein when a second action on said actuator by the user is detected, a control signal is sent across the wireless interface to cause detectors to capture an image or images of said pointer-spot in said active-display, and to cause a processor or processors, to analyze said captured image or images to determine which selectable-object, the pointer-spot is on or near in said active-display; wherein when a selectable-object is determined to have been selected by the pointer-spot, the processor sends control information to affect at least one electronic device.

11. Apparatus for controlling one or more electronic devices, comprising:
a wearable unit having an opening sized to be worn on a hand or finger(s) of a user;
a light-emitting pointer incorporated as part of said wearable unit, wherein a pointer-spot of light is projected when said pointer is activated;
a wireless interface incorporated as part of said wearable unit;
only a single actuator, incorporated as part of said wearable unit, so that when the user is wearing said wearable unit, the user is able to actuate said actuator with a thumb of a hand the wearable unit is being worn on;
wherein, when a first action on said actuator by the user is detected, the light-emitting pointer is activated, and a control signal is sent across the wireless interface to turn-on an active control-display in a detection-region, and to cause selectable-objects to appear in said detection-region;
wherein, when the user is wearing said wearable unit, the user is able to place the pointer-spot onto a selectable-object in said detection-region while the user is able to activate the actuator with a second action;
wherein when a second action on said actuator by the user is detected, a control signal is sent across the wireless interface to cause detectors to capture an image or images of said pointer-spot in said detection-region, and to cause a processor or processors, to analyze said captured image or images to determine which selectable-object, the pointer-spot is on or near; wherein when a selectable-object is determined to have been selected by the pointer-spot, the processor sends control information to affect at least one electronic device.

12. Apparatus as in claim 1 wherein said actuator only moves in a substantially single axis when actuated by the user; wherein said first action is to push the actuator from an off-position into a second position and the said second action is to push the actuator further into a third position.

13. Apparatus as in claim 1 wherein said actuator only moves in a substantially single axis when actuated by the user; wherein said first action is to push said actuator from an off-position into a second position; and the said second action is to release said actuator, so said actuator automatically returns to said off-position.

14. Apparatus as in claim 1 wherein said actuator only moves in a substantially single axis when actuated by the user; wherein said first action: is to push said actuator from an off position into a second position and then release said actuator so it returns to said off position; wherein said second action is to push the actuator from an off position into said second position and then release said actuator so it returns to said off position; wherein said second action is effective only if said second action is detected before a time-out period has elapsed.

15. Apparatus as in claim 1 further including said detection-region; wherein detectors or imager(s) or camera(s), are physically attached-to or physically integrated-into said detection-region; wherein an area imaged by each detector in said detection-region, does not change when said detection-region or an active-display, is moved or re-oriented.

16. Apparatus as in claim 1 further comprising a network interconnecting a plurality of electronic-devices; wherein said control information is sent to a plurality of electronic devices that are attached to said network; wherein the network automatically incorporates a newly connected electronic-device into said network, or automatically removes a newly disconnected electronic-device from said network.

17. Apparatus as in claim 1 wherein said detectors are distributed across an area of said detection-region; wherein a distance between detectors, is less than a diameter of said pointer-spot.

18. Apparatus as in claim 1 wherein activities resulting from said first action are undone, unless said second action is detected before a time-out period has elapsed.

19. Apparatus as in claim 1 wherein said detection-region comprises an active-display; wherein a portion of said active-display imaged by each of said detectors does not change, when said active-display is moved or re-oriented.

20. Apparatus as in claim 1 wherein locations in said detection-region that each detector images, is set during manufacture of said detection-region; wherein said detectors image same said locations in said detection-region, when said detection-region is moved or re-oriented.

21. Apparatus as in claim 1 wherein said opening is adjustable to different sized hands or fingers of a plurality of different users.

22. Apparatus as in claim 1 wherein if prior to said first action, entertainment content without selectable-objects is being displayed on an active-display in said detection-region; then said first action causes the active-display to display selectable-objects on said active-display.

* * * * *